United States Patent
Wu et al.

(10) Patent No.: US 11,283,500 B2
(45) Date of Patent: Mar. 22, 2022

(54) METHOD AND DEVICE IN UE AND BASE STATION FOR WIRELESS COMMUNICATION

(71) Applicant: SHANGHAI LANGBO COMMUNICATION TECHNOLOGY COMPANY LIMITED, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 3 days.

(21) Appl. No.: 16/896,215

(22) Filed: Jun. 9, 2020

(65) Prior Publication Data
US 2020/0304188 A1   Sep. 24, 2020

Related U.S. Application Data

(63) Continuation of application No. PCT/CN2017/117061, filed on Dec. 19, 2017.

(51) Int. Cl.
*H04B 7/06* (2006.01)
*H04W 16/14* (2009.01)
(Continued)

(52) U.S. Cl.
CPC .......... *H04B 7/0617* (2013.01); *H04W 16/14* (2013.01); *H04W 24/02* (2013.01);
(Continued)

(58) Field of Classification Search
CPC .................................................... H04W 16/14
See application file for complete search history.

(56) References Cited

U.S. PATENT DOCUMENTS

2005/0233715 A1* 10/2005 Laroia .............. H04B 17/327
455/133

FOREIGN PATENT DOCUMENTS

| CN | 104780544 A | 7/2015 |
| CN | 105515740 A | 4/2016 |

(Continued)

OTHER PUBLICATIONS

ISR received in application No. PCT/CN2017/117061 dated Aug. 10, 2018.

(Continued)

*Primary Examiner* — Sulaiman Nooristany
(74) *Attorney, Agent, or Firm* — Maschoff Brennan

(57) ABSTRACT

The disclosure provides a method and a device in a User Equipment (UE) and a base station for wireless communication. A first node receives T first-type radio signals, and transmits T second-type radio signals in T time windows respectively; and the first node performs Q time(s) of energy detection(s) in Q time subpool(s) on a first frequency subband respectively to obtain Q detection value(s). The T second-type radio signals are one-to-one corresponding to the T first-type radio signals; only T1 first-type radio signal (s) among the T first-type radio signals is(are) used for determining the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set.

16 Claims, 18 Drawing Sheets

(51) Int. Cl.
  *H04W 24/02* (2009.01)
  *H04W 72/12* (2009.01)
  *H04W 74/08* (2009.01)
  *H04L 5/00* (2006.01)

(52) U.S. Cl.
  CPC ... *H04W 72/1278* (2013.01); *H04W 74/0816* (2013.01); *H04L 5/0023* (2013.01)

(56) References Cited

FOREIGN PATENT DOCUMENTS

| | | |
|---|---|---|
| CN | 107079492 | 8/2017 |
| WO | 2017171026 A | 10/2017 |

OTHER PUBLICATIONS

CN201780094908.5 Second Office Action dated Dec. 25, 2020.
CN201780094908.5 Second Search Report dated Oct. 15, 2020.
1st Office Action received in application No. 201780094908.5 dated Oct. 26, 2020.
1st Search Report received in application No. 201780094908.5 dated Oct. 15, 2020.

* cited by examiner

METHOD AND DEVICE IN UE AND BASE STATION FOR WIRELESS COMMUNICATION

CROSS REFERENCE TO RELATED APPLICATIONS

This application is a continuation of International Application No. PCT/CN2017/117061, filed on Dec. 19, 2017, claiming the priority benefit of International Application PCT/CN2017/117061, filed on Dec. 19, 2017, the full disclosure of which is incorporated herein by reference.

BACKGROUND

Technical Field

The disclosure relates to transmission methods and devices in wireless communication systems, and in particular to a communication method and device supporting data transmission on unlicensed spectrum.

Related Art

Application scenarios of future wireless communication systems are becoming increasingly diversified, and different application scenarios have different performance requirements for systems. In order to meet different performance requirements of various application scenarios, the $3^{rd}$ Generation Partner Project (3GPP) Radio Access Network (RAN) #75 plenary session had approved a study item of access to unlicensed spectrum under New Radio (NR). The study item is expected to be accomplished in R15 and then to initiate WI in R16 to standardize related technologies.

In Long Term Evolution (LTE) License Assisted Access (LAA), a transmitter (base station or UE) needs to perform LBT before transmitting data on unlicensed spectrum so as to avoid causing interferences to other wireless transmissions that are ongoing on unlicensed spectrum. In the Cat 4 LBT (Category 4 LBT, refer to 3GPP TR36.889) process, the transmitter will conduct backoff after a certain defer duration, the time of backoff is counted in unit of a Clear Channel Assessment (CCA) slot duration, and the number of slot durations of backoff is obtained by the transmitter's random selection in a Contention Window Size (CWS). For downlink transmission, the CWS is adjusted according to a Hybrid Automatic Repeat reQuest (HARD) feedback corresponding to data in one previous reference subframe transmitted on the unlicensed spectrum. For uplink transmission, the CWS is adjusted according to whether data in one previous reference subframe on the unlicensed spectrum includes new data.

Massive Multi-Input Multi-Output (MIMO) is another research hotspot of NR system. In massive MIMO, multiple antennas experience beamforming to form a relatively narrow beam which points to a particular direction to improve the quality of communication. In NR systems, massive MIMO will be applied to unlicensed spectrum of millimeter wave band.

SUMMARY

The inventor finds through researches that, in NR systems, interference situations in different beam directions have a big difference due to the adoption of massive MIMO technology; therefore, when determining a CWS, it is needed to take the influence of beam direction into account. If a transmitting node employs a particular beam when performing LBT, the CWS needs to be able to correctly reflect the interference situation in this particular beam direction. Thus, a new requirement is put forward on the selection of a reference subframe.

In view of the discoveries, the disclosure provides a solution. It should be noted that embodiments of the disclosure and characteristics of the embodiments may be mutually combined arbitrarily, if not conflict is incurred.

The disclosure provides a method in a first node for wireless communication, wherein the method includes:

receiving T first-type radio signals, and transmitting T second-type radio signals in T time windows respectively; and performing Q time(s) of energy detection(s) in Q time subpool(s) on a first frequency subband respectively to obtain Q detection value(s).

Herein, the T second-type radio signals are one-to-one corresponding to the T first-type radio signals; only T1 first-type radio signal(s) among the T first-type radio signals is(are) used for determining the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s); and the first node is a base station, or the first node is a UE.

In one embodiment, the above method is characterized in that: T1 time window(s) among the T time windows that is(are) corresponding to the T1 first-type radio signal(s) respectively represent(s) reference subframe(s); the specific definition of the reference subframe can refer to Chapter 15 in 3GPP TS36.213. The above method enables the first node to consider multiantenna related configurations of each reference subframe when selecting reference subframes, for example, transmitting antenna port group, beamforming vector, etc., so that the CWS can correctly reflect the interference situation in the beam direction to which the Q time(s) of energy detection(s) point(s), and thus an optimal backoff contention window can be configured for the Q time(s) of energy detection(s).

According to one aspect of the disclosure, the first node is a base station, the T first-type radio signals are used for determining whether the T second-type radio signals are correctly received respectively.

According to one aspect of the disclosure, T1 second-type radio signal(s) is(are) (a) second-type radio signal(s) among the T second-type radio signals that is(are) corresponding to the T1 first-type radio signal(s) respectively; the T1 second-type radio signal(s) include(s) W sub-signal(s), the T1 first-type radio signal(s) is(are) used for determining whether any one of the W sub-signal(s) is correctly received; a ratio of a number of sub-signal(s) not correctly received among the W sub-signal(s) to the W is used for determining the Q; and the W is a positive integer not less than the T1.

According to one aspect of the disclosure, the first node is a UE, and the T first-type radio signals include scheduling information of the T second-type radio signals respectively.

According to one aspect of the disclosure, T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) include(s) new data respectively;

and a number of second-type radio signal(s) including new data among the T1 second radio signal(s) is used for determining the Q.

According to one aspect of the disclosure, a spatial Tx parameter corresponding to at least one antenna port in the first antenna port set is associated with a spatial Rx parameter corresponding to the Q time(s) of energy detection(s).

In one embodiment, the above method has the following benefits: the transmitting beam direction of the T1 second radio signal(s) is consistent with the receiving beam direction corresponding to the Q time(s) of energy detection(s), thus, the T1 first-type radio signal(s) can correctly reflect the interference situation in the beam direction to which the Q time(s) of energy detection(s) point(s), and an optimal contention window is configured for the Q time(s) of energy detection(s).

According to one aspect of the disclosure, the first antenna port set is unrelated to both a spatial Rx parameter corresponding to the Q time(s) of energy detection(s) and (a) position(s) of the Q time subpool(s) in time domain.

In one embodiment, the above method has the following benefits: there is no need to dynamically select the multi-antenna configuration of the reference sub-frame according to the specific situation of each LBT, which reduces the complexity of implementation.

In one embodiment, the above method has the following benefits: the setting of the first antenna port set may ensure that the beam direction of each LBT is covered in the beam direction of the antenna port in the first antenna port set, thereby ensuring that the reference subframe can provide sufficiently accurate interference information for each LBT, and configuring one reasonable contention window.

According to one aspect of the disclosure, the T1 first-type radio signal(s) is(are) used for determining K candidate integer(s), Q1 is one of the K candidate integer(s); Q1 detection value(s) among the Q detection value(s) is(are) all less than a first threshold, the K is a positive integer, and the Q1 is a positive integer not greater than the Q.

According to one aspect of the disclosure, the method further includes:

transmitting a third radio signal.

Herein, a start of time domain resources occupied by the third radio signal is not earlier than an end of the Q time subpool(s).

According to one aspect of the disclosure, the method further includes:

operating a first signaling.

Herein, the first signaling includes scheduling information of the third radio signal; the operating is receiving, and the first node is a UE; or the operating is transmitting, and the first node is a base station.

The disclosure provides a device in a first node for wireless communication, wherein the device includes:

a first processor, to receive T first-type radio signals, and to transmit T second-type radio signals in T time windows respectively; and a first receiver, to perform Q time(s) of energy detection(s) in Q time subpool(s) on a first frequency subband respectively to obtain Q detection value(s).

Herein, the T second-type radio signals are one-to-one corresponding to the T first-type radio signals; only T1 first-type radio signal(s) among the T first-type radio signals is(are) used for determining the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s); and the first node is a base station, or the first node is a UE.

In one embodiment, the device in the first node for wireless communication is characterized in that: the first node is a base station, the T first-type radio signals are used for determining whether the T second-type radio signals are correctly received respectively.

In one embodiment, the device in the first node for wireless communication is characterized in that: T1 second-type radio signal(s) is(are) (a) second-type radio signal(s) among the T second-type radio signals that is(are) corresponding to the T1 first-type radio signal(s) respectively; the T1 second-type radio signal(s) include(s) W sub-signal(s), the T1 first-type radio signal(s) is(are) used for determining whether any one of the W sub-signal(s) is correctly received; a ratio of a number of sub-signal(s) not correctly received among the W sub-signal(s) to the W is used for determining the Q; and the W is a positive integer not less than the T1.

In one embodiment, the device in the first node for wireless communication is characterized in that: the first node is a UE, and the T first-type radio signals include scheduling information of the T second-type radio signals respectively.

In one subembodiment, the device in the first node for wireless communication is characterized in that: T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) include(s) new data respectively; and a number of second-type radio signal(s) including new data among the T1 second radio signal(s) is used for determining the Q.

In one embodiment, the device in the first node for wireless communication is characterized in that: a spatial Tx parameter corresponding to at least one antenna port in the first antenna port set is associated with a spatial Rx parameter corresponding to the Q time(s) of energy detection(s).

In one embodiment, the device in the first node for wireless communication is characterized in that: the first antenna port set is unrelated to both a spatial Rx parameter corresponding to the Q time(s) of energy detection(s) and (a) position(s) of the Q time subpool(s) in time domain.

In one embodiment, the device in the first node for wireless communication is characterized in that: the T1 first-type radio signal(s) is(are) used for determining K candidate integer(s), Q1 is one of the K candidate integer(s); Q1 detection value(s) among the Q detection value(s) is(are) all less than a first threshold, the K is a positive integer, and the Q1 is a positive integer not greater than the Q.

In one embodiment, the device in the first node for wireless communication is characterized in that: the first processor further transmits a third radio signal; wherein a start of time domain resources occupied by the third radio signal is not earlier than an end of the Q time subpool(s).

In one embodiment, the device in the first node for wireless communication is characterized in that: the first processor further receives a first signaling; wherein the first signaling includes scheduling information of the third radio signal; and the first node is a UE.

In one embodiment, the device in the first node for wireless communication is characterized in that: the first processor further transmits a first signaling; wherein the first signaling includes scheduling information of the third radio signal; and the first node is a base station.

In one embodiment, compared with conventional schemes, the disclosure has the following benefits.

For each LBT, the transmitting node takes the beam direction to which this LBT points into account when selecting a CWS, and selects the subframe of the data of which a transmitting beam is consistent with a receiving beam of this LBT as a reference subframe. This method ensures that the interference information on the reference subframe can correctly reflect the interference status in the beam direction of LBT, and thus configures one optimal CWS for LBT.

A common multiantenna related configuration is set for all beam directions of LBT, for example, a common antenna port group or an analog beamforming vector, to guide the selection of subframe, thereby reducing complexity of implementation. Meanwhile, this common multiantenna related configuration corresponds to a wide beam, so as to ensure that the beam direction of each LBT is covered in this wide beam. This method ensures that the selected reference subframe can provide sufficiently accurate interference information for each LBT, thereby configuring one reasonable CWS.

BRIEF DESCRIPTION OF TH E DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
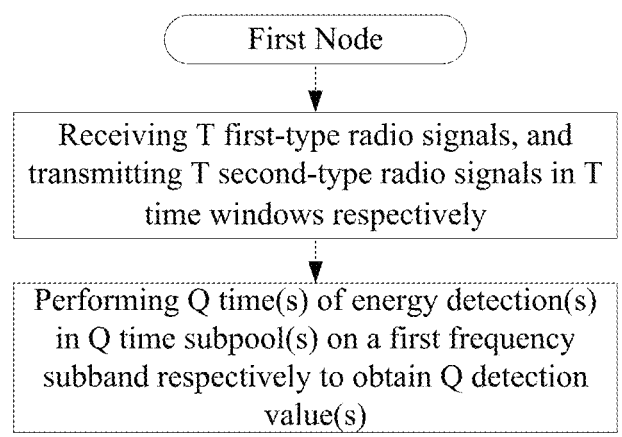
FIG. 1 is a flowchart of T first-type radio signals, T second-type radio signals and Q time(s) of energy detection(s) according to one embodiment of the disclosure.

Embodiment 1 illustrates a flowchart of T first-type radio signals, T second-type radio signals and Q time(s) of energy detection(s), as shown in FIG. 1.

In Embodiment 1, the first node in the disclosure receives T first-type radio signals, transmits T second-type radio signals in T time windows respectively, and performs Q time(s) of energy detection(s) in Q time subpool(s) on a first frequency subband respectively to obtain Q detection value(s), wherein the T second-type radio signals are one-to-one corresponding to the T first-type radio signals; only T1 first-type radio signal(s) among the T first-type radio signals is(are) used for determining the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s); and the first node is a base station, or the first node is a UE.

In one embodiment, time domain resources occupied by any two of the T first-type radio signals are orthogonal to each other (non-overlapping).

In one embodiment, the T time windows are pairwise orthogonal (non-overlapping) in the time domain.

In one embodiment, the phrase that a given radio signal is associated to the first antenna port set refers that: the given radio signal is associated to at least one antenna port in the first antenna port set.

In one embodiment, the phrase that a given radio signal is associated to a given antenna port refers that: any one transmitting antenna port for the given radio signal is Quasi Co-Located (QCLed) with the given antenna port.

In one embodiment, the phrase that a given radio signal is associated to a given antenna port refers that: at least one transmitting antenna port for the given radio signal is Quasi QCLed with the given antenna port.

In one embodiment, the phrase that a given radio signal is associated to a given antenna port refers that: any one transmitting antenna port for the given radio signal is spatially QCLed with the given antenna port.

In one embodiment, the phrase that a given radio signal is associated to a given antenna port refers that: at least one transmitting antenna port for the given radio signal is spatially QCLed with the given antenna port.

In one embodiment, any one transmitting antenna port for any one of the T first-type radio signals other than the T1 first-type radio signal(s) is not QCLed with any one antenna port in the first antenna port set.

In one embodiment, any one transmitting antenna port for any one of the T first-type radio signals other than the T1 first-type radio signal(s) is not spatially QCLed with any one antenna port in the first antenna port set.

In one embodiment, any one of the T first-type radio signals includes data.

In one embodiment, any one of the T second-type radio signals includes control information.

In one embodiment, the first antenna port set includes one antenna port.

In one embodiment, the first antenna port set includes multiple antenna ports.

In one embodiment, the Q time(s) of energy detection(s) is(are) used for determining whether the first frequency subband is idle.

In one embodiment, the Q time(s) of energy detection(s) is(are) used for determining whether the first frequency subband can be used by the first node to transmit a radio signal.

In one embodiment, the T first-type radio signals are all transmitted on the first frequency subband.

In one embodiment, the T first-type radio signals are all transmitted on a frequency band other than the first frequency subband.

In one embodiment, the T first-type radio signals are all transmitted on a frequency band deployed on licensed spectrum.

In one embodiment, the T second-type radio signals are all transmitted on the first frequency subband.

In one embodiment, the first frequency subband is deployed on unlicensed spectrum.

In one embodiment, the first frequency subband is one carrier.

In one embodiment, the first frequency subband is one Bandwidth Part (BWP).

In one embodiment, the first frequency subband includes a positive integer number of Physical Resource Block(s) (PRB(s)) in frequency domain.

In one embodiment, the first frequency subband includes a positive integer number of consecutive PRB(s) in frequency domain.

In one embodiment, the first frequency subband includes a positive integer number of consecutive subcarrier(s) in frequency domain.

In one embodiment, the Q time(s) of energy detection(s) is(are) energy detection(s) involved in LBT, and the specific definition and implementation method of LBT can refer to 3GPP TR36.889.

In one embodiment, the Q time(s) of energy detection(s) is(are) energy detection(s) involved in CCA, and the specific definition and implementation method of LBT can refer to 3GPP TR36.889.

In one embodiment, any one of the Q time(s) of energy detection(s) is implemented through the method defined in Chapter 15 in 3GPP TR36.889.

In one embodiment, any one of the Q time(s) of energy detection(s) is implemented through the energy detection method in WiFi.

In one embodiment, any one of the Q time(s) of energy detection(s) is implemented by measuring a Received Signal Strength Indication (RSSI).

In one embodiment, any one of the Q time(s) of energy detection(s) is implemented through the energy detection method in LTE LAA.

In one embodiment, time domain resources occupied by any one of the Q time subpool(s) are consecutive.

In one embodiment, the Q time subpools are pairwise orthogonal (non-overlapping) in time domain.

In one embodiment, a duration of any one of the Q time subpool(s) is one of 16 microseconds or 9 microseconds.

In one embodiment, at least two of the Q time subpools have unequal durations.

In one embodiment, any two of the Q time subpools have equal durations.

In one embodiment, time domain resources occupied by the Q time subpools are consecutive.

In one embodiment, time domain resources occupied by at least two of the Q time subpools are inconsecutive.

In one embodiment, time domain resources occupied by any two of the Q time subpools are inconsecutive.

In one embodiment, any one of the Q time subpool(s) is one slot duration.

In one embodiment, any one of the Q time subpool(s) is $T_{sl}$, the $T_{sl}$ is a slot duration, and the specific definition of the $T_{sl}$ can refer to Chapter 15 in 3GPP TS36.213.

In one embodiment, any one of the Q time subpool(s) other than an earliest time subpool is a slot duration.

In one embodiment, any one of the Q time subpool(s) other than an earliest time subpool is $T_{sl}$, the $T_{sl}$ is a slot duration, and the specific definition of the $T_{sl}$ can refer to Chapter 15 in 3GPP TS36.213.

In one embodiment, at least one of the Q time subpool(s) has a duration of 16 microseconds.

In one embodiment, at least one of the Q time subpool(s) has a duration of 9 microseconds.

In one embodiment, an earliest one of the Q time subpool(s) has a duration of 16 microseconds.

In one embodiment, a last one of the Q time subpool(s) has a duration of 9 microseconds.

In one embodiment, the Q time subpool(s) include(s) listening time in Cat4 (Type 4) LBT.

In one embodiment, the Q time subpool(s) include(s) slot durations in defer durations and slot durations in backoff time in Cat4 (Type 4) LBT.

In one embodiment, the Q time subpool(s) include(s) slot durations in defer durations and slot durations in backoff time in a Type 1 UL channel access procedure, and the first node is a UE.

In one subembodiment, one sensing interval has a duration of 25 microseconds.

In one embodiment, the Q time subpool(s) include(s) slot durations in an initial CCA and an Enhanced Clear Channel Assessment (eCCA).

In one embodiment, the Q time(s) of energy detection(s) obtain(s) the Q detection value(s)s respectively.

In one embodiment, the Q detection value(s) is(are) reception power(s) obtained after the first node senses powers of all radio signals on the first frequency subband and averages the powers over time in Q time unit(s) respectively, wherein the Q time unit(s) is(are) a continuous period of time in the Q time subpool(s) respectively.

In one subembodiment, a duration of any of the Q time unit(s) is not less than 4 microseconds.

In one embodiment, the Q detection value(s) is(are) reception energy(energies) obtained after the first node senses energies of all radio signals on the first frequency subband and averages the energies over time in Q time unit(s) respectively, wherein the Q time unit(s) is(are) a continuous period of time in the Q time subpool(s) respectively.

In one subembodiment, a duration of any of the Q time unit(s) is not less than 4 microseconds.

In one embodiment, any given energy detection among the Q time(s) of energy detection(s) refers that: the first node monitors reception powers in a given time unit, wherein the given time unit is a continuous period of time in one of the Q time subpools that is corresponding to the given energy detection.

In one embodiment, any given energy detection among the Q time(s) of energy detection(s) refers that: the first node monitors reception energies in a given time unit, wherein the given time unit is a continuous period of time in one of the Q time subpools that is corresponding to the given energy detection.

In one embodiment, the antenna port is an antenna port.

In one embodiment, small-scale channel parameters experienced by one radio signal transmitted on one antenna port can be deduced from small-scale channel parameters experienced by another radio signal transmitted on the antenna port.

In one subembodiment, the small-scale channel parameter includes one or more of a Channel Impulse Response (CIR), a Precoding Matrix Indicator (PMI), a Channel Quality Indicator (CQI) or a Rank Indicator (RI).

In one embodiment, one antenna port is formed by multiple antennas through antenna virtualization superposition, and mapping coefficients from the multiple antennas to the one antenna port form a beamforming vector of the one antenna port.

In one subembodiment, the beamforming vector of one antenna port is formed by a product of one analog beamforming matrix and one digital beamforming vector.

In one reference embodiment of the above subembodiment, when all antennas included in the one antenna port are connected to one Radio Frequency (RF) chain, the analog beamforming matrix corresponding to the one antenna port is dimensionally reduced to an analog beamforming vector, the digital beamforming vector corresponding to the one antenna port is dimensionally reduced to one scalar, and the beamforming vector corresponding to the one antenna port is equal to the analog beamforming vector of the one antenna port.

In one embodiment, the phrase that two antenna ports are QCLed refers that: full or partial large-scale properties of a radio signal transmitted on one of the two antenna ports can be deduced from full or partial large-scale properties of a radio signal transmitted on the other one of the two antenna ports, and the large-scale properties include multiantenna related large-scale properties and multiantenna unrelated large-scale properties.

In one embodiment, a multiantenna related large-scale property of a given radio signal includes one or more of an angle of arrival, an angle of departure, a spatial correlation, a spatial TX parameter or a spatial Rx parameter.

In one embodiment, a multiantenna unrelated large-scale property of a given radio signal includes one or more of a delay spread, a Doppler spread, a Doppler shift, a path loss, an average gain or an average delay.

In one embodiment, the phrase that two antenna ports are QCLed refers that: the two antenna ports have at least one same QCL parameter, and the QCL parameter includes a multiantenna related QCL parameter and a multiantenna unrelated QCL parameter.

In one embodiment, a multiantenna related QCL parameter includes one or more of an angle of arrival, an angle of departure, a spatial correlation, a spatial TX parameter or a spatial Rx parameter.

In one embodiment, a multiantenna unrelated QCL parameter includes one or more of a delay spread, a Doppler spread, a Doppler shift, a path loss or an average gain.

In one embodiment, the phrase that two antenna ports are QCLed refers that: at least one QCL parameter of one of the two antenna ports can be deduced from at least one QCL parameter of the other one of the two antenna ports.

In one embodiment, the phrase that two antenna ports are spatially QCLed refers that: full or partial multiantenna related large-scale properties of a radio signal transmitted on one of the two antenna ports can be deduced from full or partial multiantenna related large-scale properties of a radio signal transmitted on the other one of the two antenna ports.

In one embodiment, the phrase that two antenna ports are spatially QCLed refers that: the two antenna ports have at least one same multiantenna related QCL parameter (spatial QCL parameter).

In one embodiment, the phrase that two antenna ports are spatially QCLed refers that: at least one multiantenna related QCL parameter of one of the two antenna ports can be deduced from at least one multiantenna related QCL parameter of the other one of the two antenna ports.

In one embodiment, any two antenna ports in the first antenna port set are QCLed.

In one embodiment, any two antenna ports in the first antenna port set are spatially QCLed.

In one embodiment, at least two antenna ports in the first antenna port set are not QCLed.

In one embodiment, at least two antenna ports in the first antenna port set are not spatially QCLed.

Embodiment 2

Figure 2:
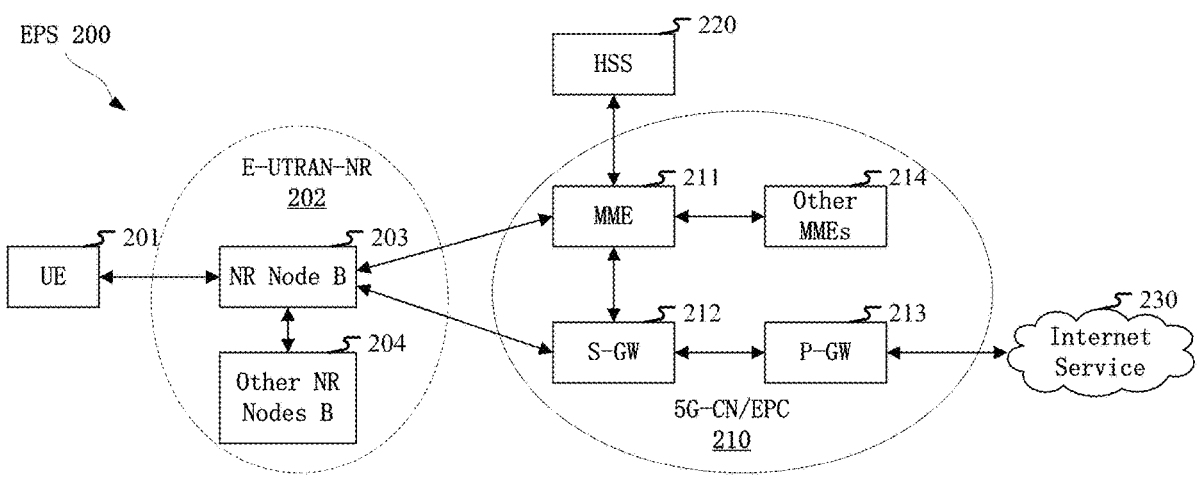
FIG. 2 is a diagram illustrating a network architecture according to one embodiment of the disclosure.

Embodiment 2 illustrates a diagram of a network architecture, as shown in FIG. 2.

FIG. 2 illustrates a network architecture 200 of Long-Term Evolution (LTE), Long-Term Evolution Advanced (LTE-A) and future 5G systems. The LTE, LTE-A and 5G system network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the first node in the disclosure, and the first node is a UE.

In one embodiment, the gNB 203 corresponds to the first node in the disclosure, and the first node is a base station.

In one subembodiment, the UE 201 supports wireless communication of data transmission on unlicensed spectrums.

In one subembodiment, the gNB 203 supports wireless communication of data transmission on unlicensed spectrums.

In one subembodiment, the UE 201 supports massive MIMO wireless communication.

In one subembodiment, the gNB 203 supports massive MIMO wireless communication.

Embodiment 3

Figure 3:
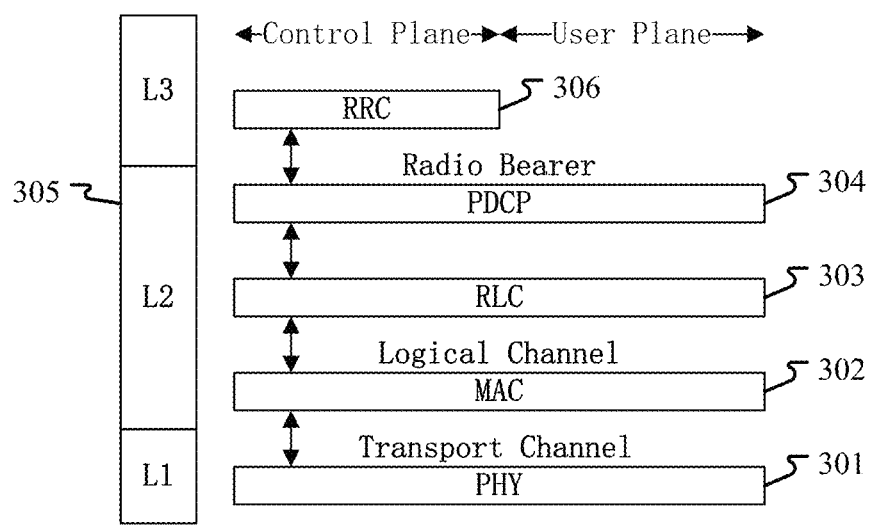
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the T first-type radio signals in the disclosure are generated on the PHY 301.

In one embodiment, the T second-type radio signals in the disclosure are generated on the PHY 301.

In one embodiment, the third radio signal in the disclosure is generated on the PHY 301.

In one embodiment, the first signaling in the disclosure is generated on the PHY 301.

In one embodiment, the first signaling in the disclosure is generated on the MAC sublayer 302.

In one embodiment, the first signaling in the disclosure is generated on the RRC sublayer 306.

Embodiment 4

Figure 4:
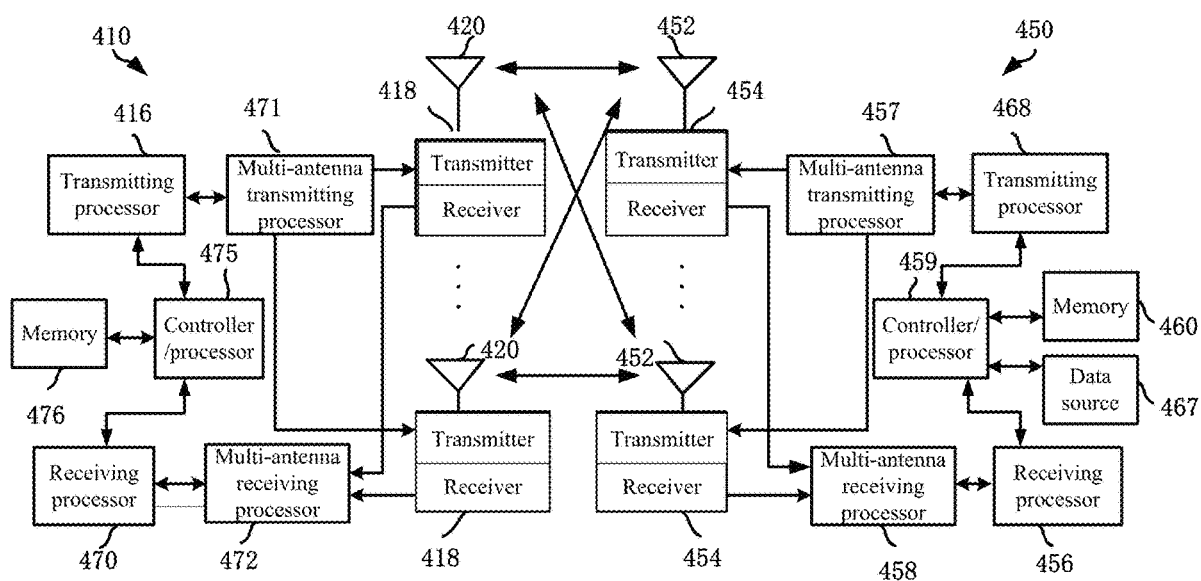
FIG. 4 is a diagram illustrating an evolved node B and a UE according to one embodiment of the disclosure.

Embodiment 4 illustrates a diagram of an NR node and a UE, as shown in FIG. 4. FIG. 4 is a block diagram of a UE 450 and a gNB 410 that communicate with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides functions of Layer 2. In downlink transmission, the controller/processor 475 provides header compression, encryption, packet segmentation and reordering, multiplexing between a logical channel and a transport channel, and a radio resource allocation for the UE 450 based on various priority metrics. The controller/processor 475 is also in charge of HARQ operation, retransmission of lost packets, and signalings to the UE450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding/beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In DL transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In Uplink (UL) transmission, at the UE 450, the data source 467 provides a higher-layer packet to the controller/processor 459. The data source 467 illustrates all protocol layers above the L2 layer. Similar as the transmitting function of the gNB 410 described in DL transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In UL transmission, the function of the gNB 410 is similar as the receiving function of the UE 450 described in the DL transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In UL transmission, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives the T first-type radio signals in the disclosure, transmits the T second-type radio signals in the disclosure in the T time windows in the disclosure respectively, and performs the Q time(s) of energy detection(s) in the disclosure in the Q time subpool(s) in the disclosure on the first frequency subband in the disclosure respectively to obtain the Q detection value(s) in the disclosure; and the first node in the disclosure is a UE.

In one embodiment, the UE 450 includes a memory that stores a computer readable instruction program. The computer readable instruction program generates an action when executed by at least one processor. The action includes: receiving the T first-type radio signals in the disclosure, transmitting the T second-type radio signals in the disclosure in the T time windows in the disclosure respectively, and performing the Q time(s) of energy detection(s) in the disclosure in the Q time subpool(s) in the disclosure on the first frequency subband in the disclosure respectively to obtain the Q detection value(s) in the disclosure; and the first node in the disclosure is a UE.

In one embodiment, the UE 450 includes at least one processor and at least one memory. The at least one memory includes computer program codes. The at least one memory and the computer program codes are configured to be used in collaboration with the at least one processor. The UE 450 at least transmits the T first-type radio signals in the disclosure, and receives the T second-type radio signals in the disclosure in the T time windows in the disclosure respectively; and the first node in the disclosure is a base station.

In one embodiment, the UE 450 includes a memory that stores a computer readable instruction program. The computer readable instruction program generates an action when executed by at least one processor. The action includes: transmitting the T first-type radio signals in the disclosure, and receiving the T second-type radio signals in the disclosure in the T time windows in the disclosure respectively; and the first node in the disclosure is a base station.

In one embodiment, the gNB 410 includes at least one processor and at least one memory. The at least one memory includes computer program codes. The at least one memory and the computer program codes are configured to be used in collaboration with the at least one processor. The gNB 410 at least: receives the T first-type radio signals in the disclosure, transmits the T second-type radio signals in the disclosure in the T time windows in the disclosure respectively, and performs the Q time(s) of energy detection(s) in the disclosure in the Q time subpool(s) in the disclosure on the first frequency subband in the disclosure respectively to obtain the Q detection value(s) in the disclosure; and the first node in the disclosure is a base station.

In one embodiment, the gNB 410 includes a memory that stores a computer readable instruction program. The computer readable instruction program generates an action when executed by at least one processor. The action includes: receiving the T first-type radio signals in the disclosure, transmitting the T second-type radio signals in the disclosure in the T time windows in the disclosure respectively, and performing the Q time(s) of energy detection(s) in the disclosure in the Q time subpool(s) in the disclosure on the first frequency subband in the disclosure respectively to obtain the Q detection value(s) in the disclosure; and the first node in the disclosure is a base station.

In one embodiment, the gNB 410 includes at least one processor and at least one memory. The at least one memory includes computer program codes. The at least one memory and the computer program codes are configured to be used in collaboration with the at least one processor. The gNB 410 at least transmits the T first-type radio signals in the disclosure, and receives the T second-type radio signals in the disclosure in the T time windows in the disclosure respectively; and the first node in the disclosure is a UE.

In one embodiment, the gNB 410 includes a memory that stores a computer readable instruction program. The computer readable instruction program generates an action when executed by at least one processor. The action includes: transmitting the T first-type radio signals in the disclosure, and receiving the T second-type radio signals in the disclosure in the T time windows in the disclosure respectively; and the first node in the disclosure is a UE.

In one embodiment, the UE 450 corresponds to the first node in the disclosure, and the first node is a UE.

In one embodiment, the gNB 410 corresponds to the first node in the disclosure, and the first node is a base station.

In one embodiment, at least one of the antenna 452, the receiver 454, the receiving processor 456, the multiantenna receiving processor 458 or the controller/processor 459 is used for receiving the T first-type radio signals in the disclosure; at least one of the antenna 420, the transmitter 418, the transmitting processor 416, the multiantenna transmitting processor 471 or the controller/processor 475 is used for transmitting the T first-type radio signals in the disclosure; and the first node in the disclosure is a UE.

In one embodiment, at least one of the antenna 420, the receiver 418, the receiving processor 470, the multiantenna receiving processor 472 or the controller/processor 475 is used for receiving the T first-type radio signals in the disclosure; at least one of the antenna 452, the transmitter 454, the transmitting processor 468, the multiantenna transmitting processor 457 or the controller/processor 459 is used for transmitting the T first-type radio signals in the disclosure; and the first node in the disclosure is a base station.

In one embodiment, at least one of the antenna 420, the receiver 418, the receiving processor 470, the multiantenna receiving processor 472 or the controller/processor 475 is used for receiving the T second-type radio signals in the disclosure; at least one of the antenna 452, the transmitter 454, the transmitting processor 468, the multiantenna transmitting processor 457 or the controller/processor 459 is used for transmitting the T second-type radio signals in the disclosure; and the first node in the disclosure is a UE.

In one embodiment, at least one of the antenna 452, the receiver 454, the receiving processor 456, the multiantenna receiving processor 458 or the controller/processor 459 is used for receiving the T second-type radio signals in the disclosure; at least one of the antenna 420, the transmitter 418, the transmitting processor 416, the multiantenna transmitting processor 471 or the controller/processor 475 is used for transmitting the T second-type radio signals in the disclosure; and the first node in the disclosure is a base station.

In one embodiment, at least one of the antenna 452, the receiver 454, the receiving processor 456, the multiantenna receiving processor 458 or the controller/processor 459 is used for performing the Q time(s) of energy detection(s) in the disclosure in the Q time subpool(s) in the disclosure respectively; and the first node in the disclosure is a UE.

In one embodiment, at least one of the antenna 420, the receiver 418, the receiving processor 470, the multiantenna receiving processor 472 or the controller/processor 475 is used for performing the Q time(s) of energy detection(s) in the disclosure in the Q time subpool(s) in the disclosure respectively; and the first node in the disclosure is a base station.

In one embodiment, at least one of the antenna 420, the receiver 418, the receiving processor 470, the multiantenna receiving processor 472 or the controller/processor 475 is used for receiving the third radio signal in the disclosure; at least one of the antenna 452, the transmitter 454, the transmitting processor 468, the multiantenna transmitting processor 457 or the controller/processor 459 is used for transmitting the third radio signal in the disclosure; and the first node in the disclosure is a UE.

In one embodiment, at least one of the antenna 452, the receiver 454, the receiving processor 456, the multiantenna receiving processor 458 or the controller/processor 459 is used for receiving the third radio signal in the disclosure; at least one of the antenna 420, the transmitter 418, the transmitting processor 416, the multiantenna transmitting processor 471 or the controller/processor 475 is used for transmitting the third radio signal in the disclosure; and the first node in the disclosure is a base station.

In one embodiment, at least one of the antenna 452, the receiver 454, the receiving processor 456, the multiantenna receiving processor 458 or the controller/processor 459 is used for receiving the first signaling in the disclosure; and at least one of the antenna 420, the transmitter 418, the transmitting processor 416, the multiantenna transmitting processor 471 or the controller/processor 475 is used for transmitting the first signaling in the disclosure.

Embodiment 5

Figure 5:
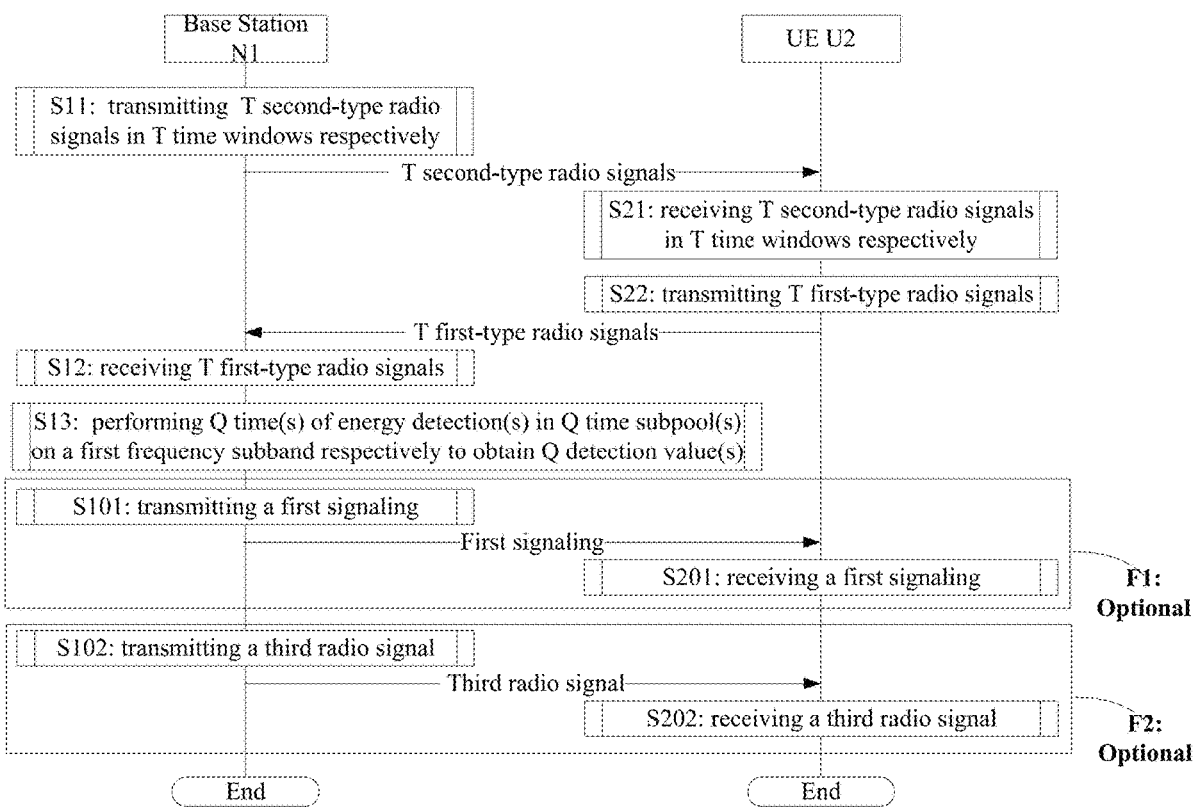
FIG. 5 is a flowchart of wireless transmission according to one embodiment of the disclosure.

Embodiment 5 illustrates a flowchart of wireless transmission, as shown in FIG. 5. In FIG. 5, a base station N1 is a maintenance base station for a serving cell of a UE U2. In FIG. 5, steps in box F1 and box F2 are optional respectively.

The N1 transmits T second-type radio signals in T time windows respectively in S11, receives T first-type radio signals in S12, performs Q time(s) of energy detection(s) in Q time subpool(s) on a first frequency subband respectively to obtain Q detection value(s) in S13, transmits a first signaling in S101, and transmits a third radio signal in S102.

The U2 receives T second-type radio signals in T time windows respectively in S21, transmits T first-type radio signals in S22, receives a first signaling in S201, and receives a third radio signal in S202.

In Embodiment 5, the T first-type radio signals are used by the N1 to determine whether the T second-type radio signals are correctly received respectively; only T1 first-type radio signal(s) among the T first-type radio signals is(are) used by the N1 to determine the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s). The first signaling includes scheduling information of the third radio signal. A start of time domain resources occupied by the third radio signal is not earlier than an end of the Q time subpool(s).

In one embodiment, each of the T first-type radio signals includes a Hybrid Automatic Repeat reQuest ACKnowledgement (HARQ-ACK).

In one embodiment, the Q time(s) of energy detection(s) is(are) energy detection(s) in a downlink access detection respectively.

In one embodiment, T1 second-type radio signal(s) is(are) (a) second-type radio signal(s) among the T second-type radio signals that is(are) corresponding to the T1 first-type radio signal(s) respectively; the T1 second-type radio signal(s) include(s) W sub-signal(s), the T1 first-type radio signal(s) is(are) used by the N1 to determine whether any one of the W sub-signal(s) is correctly received; a ratio of a number of sub-signal(s) not correctly received among the W sub-signal(s) to the W is used for determining the Q; and the W is a positive integer not less than the T1.

In one embodiment, a spatial Tx parameter corresponding to at least one antenna port in the first antenna port set is associated with a spatial Rx parameter corresponding to the Q time(s) of energy detection(s).

In one embodiment, the spatial Tx parameter includes one or more of a transmitting antenna port, a transmitting antenna port group, a transmitting beam, a transmitting analog beamforming matrix, a transmitting analog beamforming vector, a transmitting beamforming vector or transmitting spatial filtering.

In one embodiment, the spatial Rx parameter includes one or more of a receiving beam, a receiving analog beamforming matrix, a receiving analog beamforming vector, a receiving beamforming vector or receiving spatial filtering.

In one embodiment, one antenna port group includes a positive integer number of antenna port(s).

In one embodiment, any two antenna ports in one antenna port group are QCLed.

In one embodiment, any two antenna ports in one antenna port group are spatially QCLed.

In one embodiment, the phrase that a spatial Tx parameter corresponding to a given antenna port is associated with a spatial Rx parameter corresponding to the Q time(s) of energy detection(s) refers that: a transmitting analog beamforming matrix corresponding to the given antenna port is used as a receiving analog beamforming matrix corresponding to the Q time(s) of energy detection(s).

In one embodiment, the phrase that a spatial Tx parameter corresponding to a given antenna port is associated with a spatial Rx parameter corresponding to the Q time(s) of energy detection(s) refers that: a transmitting analog beamforming vector corresponding to the given antenna port is used as a receiving analog beamforming vector corresponding to the Q time(s) of energy detection(s).

In one embodiment, the phrase that a spatial Tx parameter corresponding to a given antenna port is associated with a spatial Rx parameter corresponding to the Q time(s) of energy detection(s) refers that: a transmitting beamforming vector corresponding to the given antenna port is used as a receiving beamforming vector corresponding to the Q time(s) of energy detection(s).

In one embodiment, the phrase that a spatial Tx parameter corresponding to a given antenna port is associated with a spatial Rx parameter corresponding to the Q time(s) of energy detection(s) refers that: a transmitting beam corresponding to the given antenna port is used as a receiving beam corresponding to the Q time(s) of energy detection(s).

In one embodiment, the phrase that a spatial Tx parameter corresponding to a given antenna port is associated with a spatial Rx parameter corresponding to the Q time(s) of energy detection(s) refers that: transmitting spatial filtering corresponding to the given antenna port is used as receiving spatial filtering corresponding to the Q time(s) of energy detection(s).

In one embodiment, the phrase that a spatial Tx parameter corresponding to a given antenna port is associated with a spatial Rx parameter corresponding to the Q time(s) of energy detection(s) refers that: a spatial coverage of a transmitting beam corresponding to the given antenna port is within a spatial coverage of a receiving beam corresponding to the Q time(s) of energy detection(s).

In one embodiment, a spatial Tx parameter corresponding to any one antenna port in the first antenna port set is associated with a spatial Rx parameter corresponding to the Q time(s) of energy detection(s).

In one embodiment, the first antenna port set is unrelated to a spatial Rx parameter corresponding to the Q time(s) of energy detection(s) or (a) position(s) of the Q time subpool(s) in time domain.

In one subembodiment, the first antenna port set is predefined.

In one subembodiment, the first antenna port set is default.

In one subembodiment, the first antenna port set is semi-static.

In one embodiment, a spatial Tx parameter corresponding to any one antenna port in the first antenna port set is unrelated to a spatial Rx parameter corresponding to the Q time(s) of energy detection(s) or (a) position(s) of the Q time subpool(s) in time domain.

In one embodiment, a spatial coverage of a receiving beam corresponding to the Q time(s) of energy detection(s) is within a set of spatial coverages of transmitting beams corresponding to all antenna ports in the first antenna port set.

In one embodiment, the T1 first-type radio signal(s) is(are) used by the N1 to determine K candidate integer(s), Q1 is one of the K candidate integer(s); Q1 detection value(s) among the Q detection value(s) is(are) all less than a first threshold, the K is a positive integer, and the Q1 is a positive integer not greater than the Q.

In one embodiment, a spatial Rx parameter corresponding to any transmitting antenna port of the third radio signal is associated with a spatial Rx parameter corresponding to the Q time(s) of energy detection(s).

In one embodiment, a start of time domain resources occupied by the third radio signal is an end of the Q time subpool(s).

In one embodiment, a start of time domain resources occupied by the third radio signal is later than an end of the Q time subpool(s).

In one embodiment, any one of the T first-type radio signals includes data.

In one embodiment, any one of the T second-type radio signals includes Uplink Control Information (UCI), and the first node is a base station.

In one embodiment, the third radio signal includes at least one of data, control information or reference signal.

In one subembodiment, the data is downlink data, the control information is Downlink Control Information (DCI), and the reference signal includes one or more of a DeModulation Reference Signal (DMRS), a Channel State Information-Reference Signal (CSI-RS), a fine time/frequency Tracking Reference Signal (TRS), or a Phase error Tracking Reference Signals (PRTS).

In one embodiment, the third radio signal is transmitted on the first frequency subband.

In one embodiment, scheduling information of the third radio signal includes at least one of a Modulation and Coding Scheme (MCS), configuration information of DMRS, a HARQ process number, a Redundancy Version (RV), a New Data Indicator (NDI), occupied time-frequency resources, a corresponding spatial Tx parameter or a corresponding spatial Rx parameter.

In one subembodiment, the third radio signal includes data.

In one embodiment, scheduling information of the third radio signal includes at least one of occupied time domain resources, occupied frequency domain resources, occupied code domain resources, a cyclic shift, an Orthogonal Cover Code (OCC), occupied antenna ports, a corresponding spatial Tx parameter or a corresponding spatial Rx parameter.

In one subembodiment, the third radio signal includes a reference signal.

In one embodiment, the first signaling is a physical layer signaling.

In one embodiment, the first signaling is a dynamic signaling.

In one embodiment, the first signaling is a dynamic signaling for downlink grant.

In one embodiment, the first signaling is a higher layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling is transmitted on the first frequency subband.

In one embodiment, the first signaling is transmitted on a frequency band other than the first frequency subband.

In one embodiment, the first signaling is transmitted on a frequency band deployed on licensed spectrum.

In one embodiment, the T first-type radio signals are transmitted on T uplink physical layer control channels (that is, uplink channels capable of carrying physical layer signalings only) respectively.

In one subembodiment, the T uplink physical layer control channels are Physical Uplink Control Channels (PUCCHs) respectively.

In one subembodiment, the T uplink physical layer control channels are short PUCCHs (sPUCCHs) respectively.

In one subembodiment, the T uplink physical layer control channels are New Radio PUCCHs (NR-PUCCHs) respectively.

In one subembodiment, the T uplink physical layer control channels are Narrow Band PUCCHs (NB-PUCCHs) respectively.

In one embodiment, the T first-type radio signals are transmitted on T uplink physical layer data channels (that is, uplink channels capable of carrying physical layer data) respectively.

In one subembodiment, the T uplink physical layer data channels are Physical Uplink Shared Channels (PUSCHs) respectively.

In one subembodiment, the T uplink physical layer data channels are short PUSCHs (sPUSCHs) respectively.

In one subembodiment, the T uplink physical layer data channels are New Radio PUSCHs (NR-PUSCHs) respectively.

In one subembodiment, the T uplink physical layer data channels are Narrow Band PUSCHs (NB-PUSCHs) respectively.

In one embodiment, the T second-type radio signals are transmitted on T downlink physical layer data channels (that is, downlink channels capable of carrying physical layer data) respectively.

In one subembodiment, the T downlink physical layer data channels are Physical Downlink Shared Channels (PDSCHs) respectively.

In one subembodiment, the T downlink physical layer data channels are short PDSCHs (sPDSCHs) respectively.

In one subembodiment, the T downlink physical layer data channels are New Radio PDSCHs (NR-PDSCHs) respectively.

In one subembodiment, the T downlink physical layer data channels are Narrow Band PDSCHs (NB-PDSCHs) respectively.

In one embodiment, transport channels corresponding to the T second-type radio signals are DownLink Shared Channels (DL-SCHs) respectively.

In one embodiment, the third radio signal is transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a transport channel corresponding to the third radio signal is a DL-SCH.

In one embodiment, the first signaling is transmitted on a downlink physical layer control channel (that is, a downlink channel capable of carrying physical layer signalings only).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first signaling is transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

Embodiment 6

Figure 6:
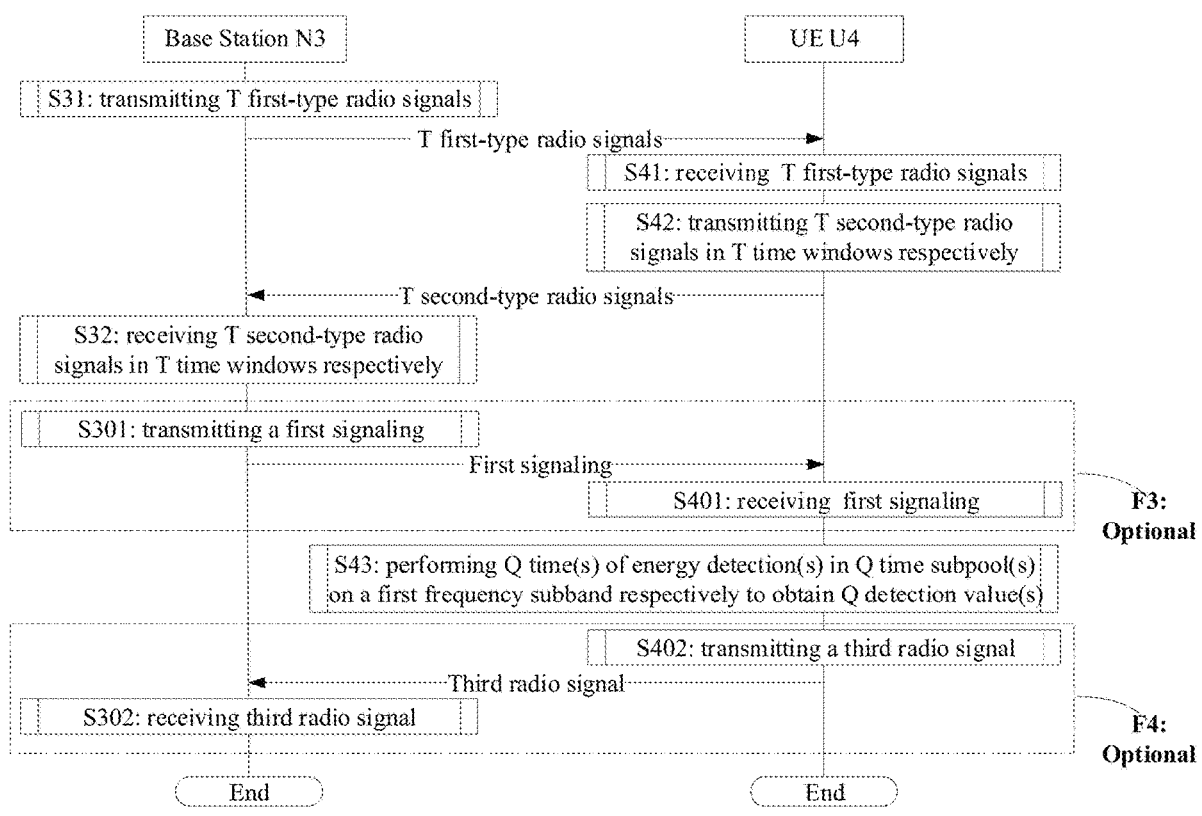
FIG. 6 is a flowchart of wireless transmission according to one embodiment of the disclosure.

Embodiment 6 illustrates a flowchart of wireless transmission, as shown in FIG. 6. In FIG. 6, a base station N3 is a maintenance base station for a serving cell of a UE U4. In FIG. 6, steps in box F3 and box F4 are optional respectively.

The N3 transmits T first-type radio signals in S31, receives T second-type radio signals in T time windows respectively in S32, transmits a first signaling in S301, and receives a third radio signal in S302.

The U4 receives T first-type radio signals in S41, transmits T second-type radio signals in T time windows respectively in S42, receives a first signaling in S401, performs Q time(s) of energy detection(s) in Q time subpool(s) on a first frequency subband respectively to obtain Q detection value(s) in S43, and transmits a third radio signal in S402.

In Embodiment 6, the T first-type radio signals include scheduling information of the T second-type radio signals; only T1 first-type radio signal(s) among the T first-type radio signals is(are) used by the U4 to determine the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s). The first signaling includes scheduling information of the third radio signal. A start of time domain resources occupied by the third radio signal is not earlier than an end of the Q time subpool(s).

In one embodiment, any one of the T second-type radio signals includes a DCI.

In one embodiment, scheduling information of any one of the T second-type radio signals includes at least one of an MCS, configuration information of DMRS, a HARQ process number, an RV, an NDI, occupied time-frequency resources, a corresponding spatial Tx parameter or a corresponding spatial Rx parameter.

In one subembodiment, the configuration information of DMRS includes one or more of occupied time domain resources, occupied frequency domain resources, occupied code domain resources, a cyclic shift or an OCC.

In one embodiment, the Q time(s) of energy detection(s) is(are) energy detection(s) in an uplink access detection respectively.

In one embodiment, T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) include(s) new data respectively; and a number of second-type radio signal(s) including new data among the T1 second radio signal(s) is used for determining the Q.

In one embodiment, the third radio signal includes at least one of data, control information or reference signal.

In one subembodiment, the data is uplink data, the control information is UCI, and the reference signal includes one or more of a DMRS, a Sounding Reference Signal (SRS) or a PTRS.

In one embodiment, the first signaling is a dynamic signaling for uplink grant.

In one embodiment, the T first-type radio signals are transmitted on T downlink physical layer control channels (that is, downlink channels capable of carrying physical layer signalings only) respectively.

In one subembodiment, the T downlink physical layer control channels are PDCCHs respectively.

In one subembodiment, the T downlink physical layer control channels are sPDCCHs respectively.

In one subembodiment, the T downlink physical layer control channels are NR-PDCCHs respectively.

In one subembodiment, the T downlink physical layer control channels are NB-PDCCHs respectively.

In one embodiment, the T second-type radio signals are transmitted on T uplink physical layer data channels (that is, uplink channels capable of carrying physical layer data) respectively.

In one subembodiment, the T uplink physical layer data channels are PUSCHs respectively.

In one subembodiment, the T uplink physical layer data channels are sPUSCHs respectively.

In one subembodiment, the T uplink physical layer data channels are NR-PUSCHs respectively.

In one subembodiment, the T uplink physical layer data channels are NB-PUSCHs respectively.

In one embodiment, transport channels corresponding to the T second-type radio signals are Uplink Shared Channels (UL-SCHs) respectively.

In one embodiment, the third radio signal is transmitted on an uplink physical layer data channel (that is, a uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, a transport channel corresponding to the third radio signal is an UL-SCH.

Embodiment 7

Figure 7:
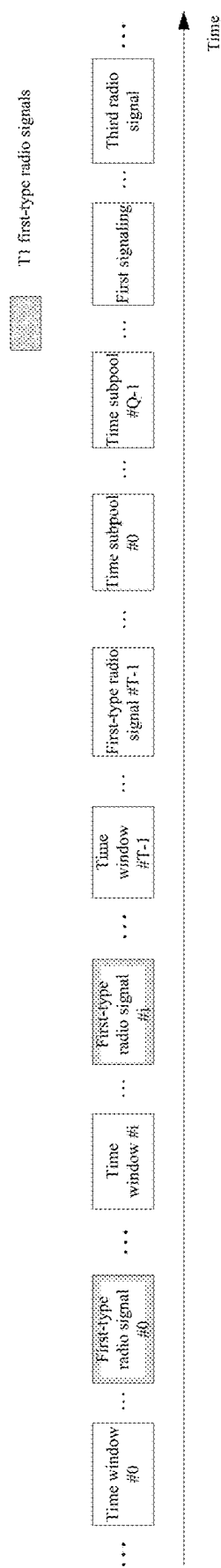
FIG. 7 is a diagram illustrating a sequential relationship among T first-type radio signals, T second-type radio signals, Q time subpools, a first signaling and a third radio signal in time domain according to one embodiment of the disclosure.

Embodiment 7 illustrates a diagram of a sequential relationship among T first-type radio signals, T second-type radio signals, Q time subpools, a first signaling and a third radio signal in time domain, as shown in FIG. 7.

In Embodiment 7, the first node in the disclosure is a base station, and the first node transmits T second-type radio signals in T time windows respectively; the T first-type radio signals are used for determining whether the T second-type radio signals are correctly received respectively; starts of time domain resources occupied by both the first signaling and the third radio signal are not earlier than an end of the Q time subpools; the first signaling includes scheduling information of the third radio signal; only T1 first-type radio signals among the T first-type radio signals are used for determining the Q; the T1 is less than the T. Time domain resources occupied by any two of the T first-type radio signals are orthogonal to each other (non-overlapping); the T time windows are pairwise orthogonal (non-overlapping) in the time domain; the Q time subpools are pairwise orthogonal (non-overlapping) in time domain. Time domain resources occupied by all the T first-type radio signals are located before the Q time subpools; T time windows are all located before the Q time subpools in time domain; for any one given first-type radio signal among the T first-type radio signals, a time window among the T time windows that is corresponding to the given first-type radio signal is located before time domain resources occupied by the given first-type radio signal in time domain.

In FIG. 7, boxes filled with left slashes represent the T1 first-type radio signals; indexes of both the T first-type radio signals and the T time windows are {#0, #1, . . . , #T−1} respectively, where i is a non-negative integer less than the T; indexes of the Q time subpools are {#0, #1, . . . , #Q−1} respectively. A first-type radio signal #x is used for determining whether a second-type radio signal transmitted in a time window #x is correctly received; and the x is any non-negative integer less than the T.

In one embodiment, the T second-type radio signals are transmitted on frequency bands deployed on unlicensed spectrum respectively.

In one embodiment, time domain resources occupied by the first signaling are located before time domain resources occupied by the third radio signal in time domain.

In one embodiment, any one of the T time windows is one subframe.

In one embodiment, any one of the T time windows is one slot.

In one embodiment, any one of the T time windows is a positive integer number of consecutive multicarrier symbol(s).

In one subembodiment, the multicarrier symbol is an Orthogonal Frequency Division Multiplexing (OFDM) symbol.

In one subembodiment, the multicarrier symbol is a Single Carrier-Frequency Division Multiple Access (SC-FDMA) symbol.

In one subembodiment, the multicarrier symbol is a DFT-S-OFDM (Discrete Fourier Transform Spread OFDM (DFT-S-OFDM) symbol.

In one subembodiment, the multicarrier symbol is a Filter Bank Multi Carrier (FBMC) symbol.

In one subembodiment, the multicarrier symbol includes a Cyclic Prefix (CP).

In one embodiment, any one of the T time windows is a continuous period of time.

In one embodiment, a burst to which a last one of the T time windows belongs is located before the Q time subpools in time domain.

In one embodiment, T1 time windows don't include a last one of the T time windows, and the T1 time windows are time windows among the T time windows that are corresponding to the T1 first-type radio signals respectively.

In one subembodiment, a last one of the T1 time windows and a last one of the T time windows belong to different bursts.

In one embodiment, the T1 is equal to 1.

In one embodiment, the T1 is greater than 1.

Embodiment 8

Figure 8:
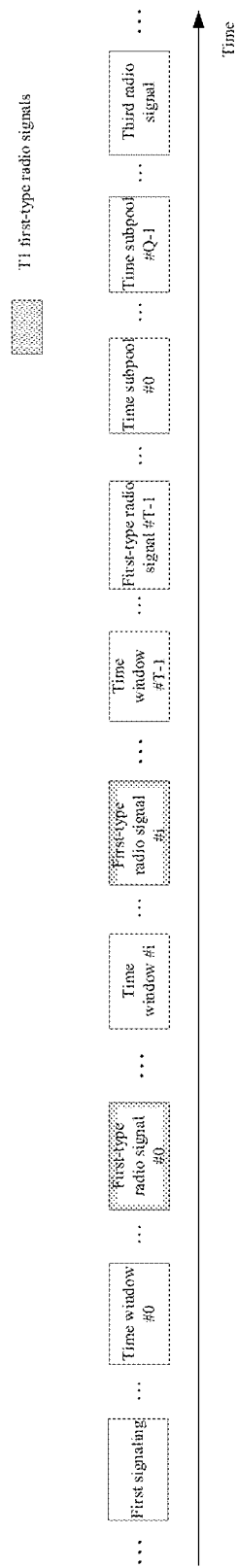
FIG. 8 is a diagram illustrating a sequential relationship among T first-type radio signals, T second-type radio signals, Q time subpools, a first signaling and a third radio signal in time domain according to one embodiment of the disclosure.

Embodiment 8 illustrates a diagram of a sequential relationship among T first-type radio signals, T second-type radio signals, Q time subpools, a first signaling and a third radio signal in time domain, as shown in FIG. 8.

In Embodiment 8, the first node in the disclosure is a base station, and the first node transmits T second-type radio signals in T time windows respectively; the T first-type radio signals are used for determining whether the T second-type radio signals are correctly received respectively; a start of time domain resources occupied by the third radio signal is not earlier than an end of the Q time subpools; the first signaling includes scheduling information of the third radio signal; an end of time domain resources occupied by the first signaling is earlier than a start of the Q time subpools; only T1 first-type radio signals among the T first-type radio signals are used for determining the Q; the T1 is less than the T. Time domain resources occupied by any two of the T first-type radio signals are orthogonal to each other (non-overlapping); the T time windows are pairwise orthogonal (non-overlapping) in the time domain; the Q time subpools are pairwise orthogonal (non-overlapping) in time domain. Time domain resources occupied by all the T first-type radio signals are located before the Q time subpools; T time windows are all located before the Q time subpools in time domain; for any one given first-type radio signal among the T first-type radio signals, a time window among the T time windows that is corresponding to the given first-type radio signal is located before time domain resources occupied by the given first-type radio signal in time domain.

In FIG. 8, boxes filled with left slashes represent the T1 first-type radio signals; indexes of both the T first-type radio signals and the T second-type radio signals are {#0, #1, . . . , #T−1} respectively, where i is a non-negative integer less than the T; indexes of the Q time subpools are {#0, #1, . . . , #Q−1} respectively. A first-type radio signal #x is used for determining whether a second-type radio signal transmitted in a time window #x is correctly received; and the x is any non-negative integer less than the T.

Embodiment 9

Figure 9:
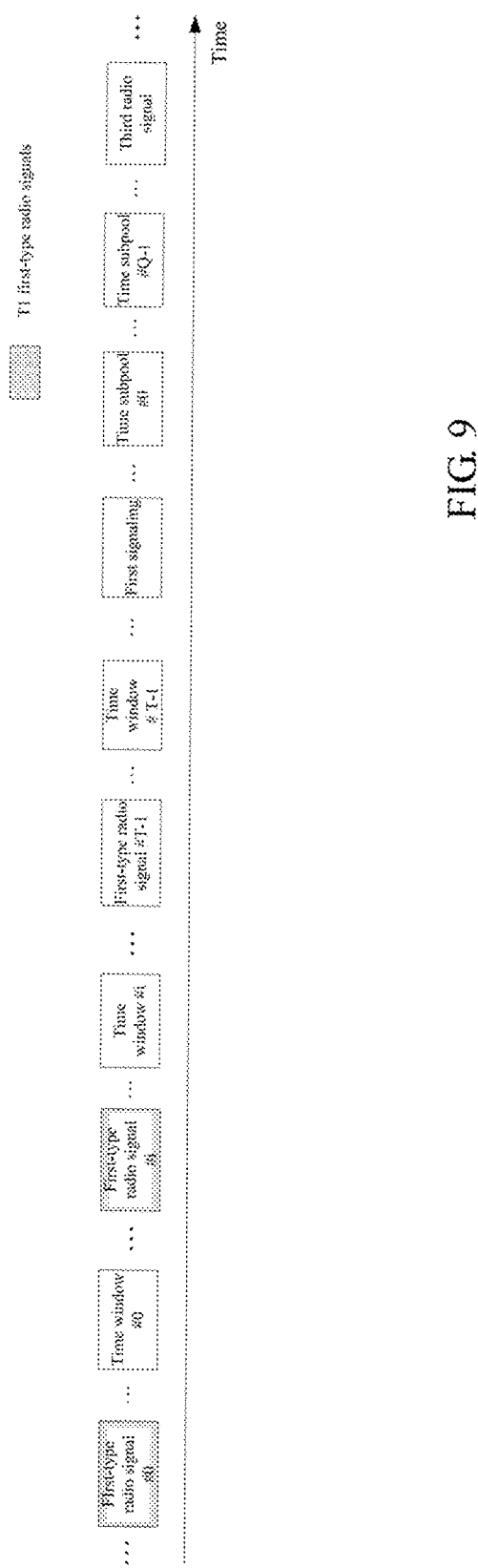
FIG. 9 is a diagram illustrating a sequential relationship among T first-type radio signals, T second-type radio signals, Q time subpools, a first signaling and a third radio signal in time domain according to one embodiment of the disclosure.

Embodiment 9 illustrates a diagram of a sequential relationship among T first-type radio signals, T second-type radio signals, Q time subpools, a first signaling and a third radio signal in time domain, as shown in FIG. 9.

In Embodiment 9, the first node in the disclosure is a UE, and the first node transmits T second-type radio signals in T time windows respectively; the T first-type radio signals include scheduling information of the T second-type radio signals respectively; a start of time domain resources occupied by the third radio signal is not earlier than an end of the Q time subpools; the first signaling includes scheduling information of the third radio signal; an end of time domain resources occupied by the first signaling is earlier than a start of the Q time subpools; only T1 first-type radio signals among the T first-type radio signals are used for determining the Q; the T1 is less than the T. Time domain resources occupied by any two of the T first-type radio signals are orthogonal to each other (non-overlapping); the T time windows are pairwise orthogonal (non-overlapping) in the time domain; the Q time subpools are pairwise orthogonal (non-overlapping) in time domain. Time domain resources occupied by all the T first-type radio signals are located before the Q time subpools; T time windows are all located before the Q time subpools in time domain; for any one given first-type radio signal among the T first-type radio signals, a time window among the T time windows that is corresponding to the given first-type radio signal is located behind time domain resources occupied by the given first-type radio signal in time domain.

In FIG. 9, boxes filled with left slashes represent the T1 first-type radio signals; indexes of both the T first-type radio signals and the T second-type radio signals are {#0, #1, . . . , #T−1} respectively, where i is a non-negative integer less than the T; indexes of the Q time subpools are {#0, #1, . . . , #Q−1} respectively. A first-type radio signal #x includes scheduling information of a second-type radio signal transmitted in a time window #x; and the x is any non-negative integer less than the T.

In one embodiment, a time interval between a burst to which a last one of the T time windows belongs and time domain resources occupied by the first signaling is not less than a first time interval.

In one subembodiment, the first time interval is a positive integer number of subframe(s).

In one subembodiment, the first time interval is 3 subframes.

In one subembodiment, the first time interval is a positive integer number of slot(s).

In one subembodiment, the first time interval is a positive integer number of multicarrier symbol(s).

In one subembodiment, the first time interval is predefined.

In one subembodiment, the first time interval is default.

Embodiment 10

Figure 10:
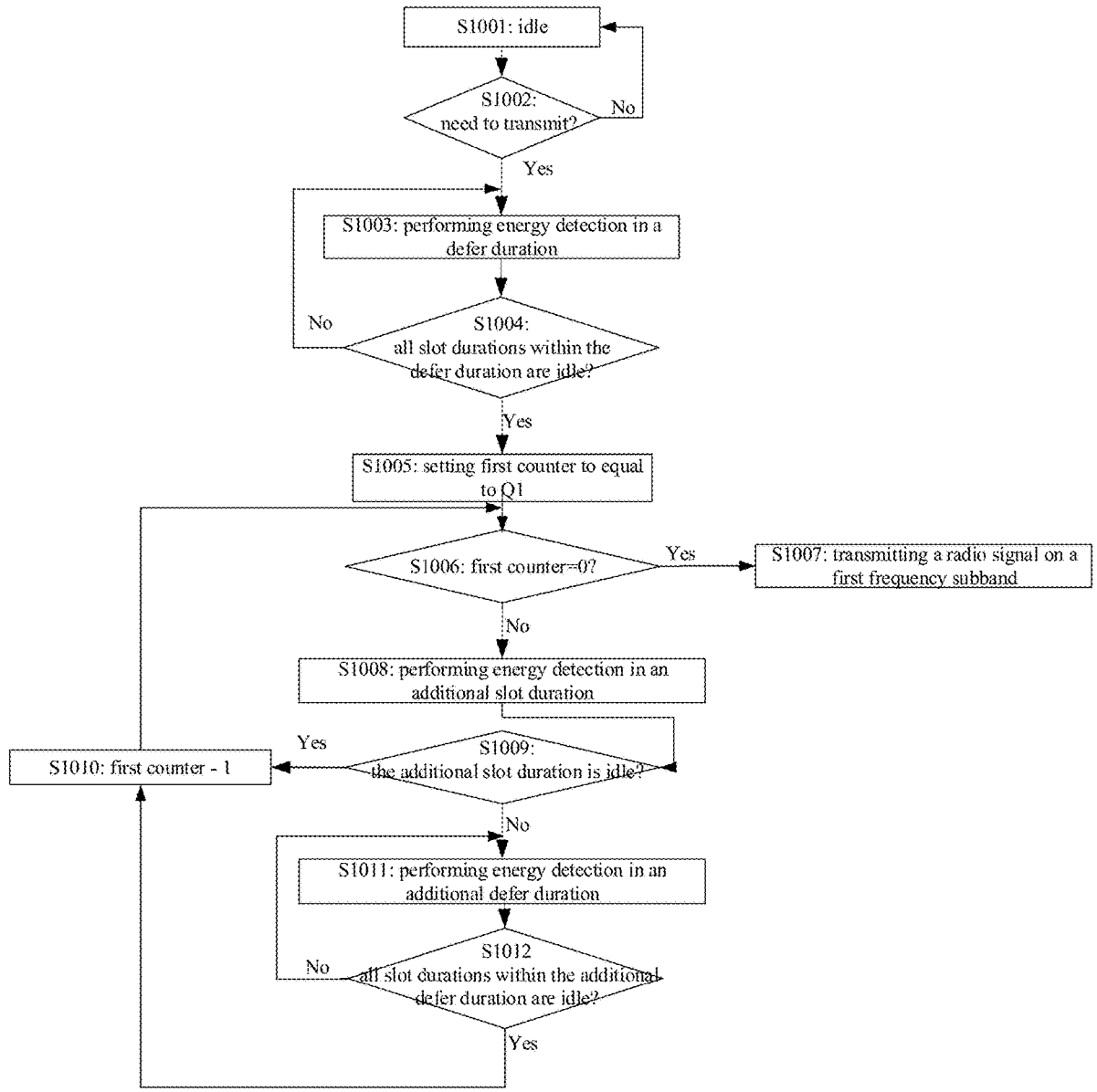
FIG. 10 is a diagram illustrating a process of performing Q times of energy detections in Q time subpools respectively according to one embodiment of the disclosure.

Embodiment 10 illustrates a diagram of a process of performing Q times of energy detections in Q time subpools respectively, as shown in FIG. 10.

In Embodiment 10, the first node in the disclosure performs the Q times of energy detections in the Q time subpools on the first frequency subband in the disclosure respectively to obtain Q detection values. Q1 detection values among the Q detection values are each less than the first threshold in the disclosure. Q1 time subpools are time subpools among the Q time subpools which are corresponding to the Q1 detection values respectively. The process of the Q times of energy detections can be described through the flowchart shown in FIG. 10.

In FIG. 10, the first node in the disclosure is in an idle state in S1001; determines whether it is needed to transmit signals in S1002; performs an energy detection in a defer duration in S1003; determines whether all slot durations within the defer duration are idle in S1004, if yes, goes to S1005 to set a first counter to equal to Q1, otherwise, returns to S1004; determines whether the first counter is 0 in S1006, if yes, goes to S1007 to transmit a radio signal on the first frequency subband, otherwise, goes to S1008 to perform an energy detection in an additional slot duration; determines whether the additional slot duration is idle in S1009, if yes, goes to step S1010 to subtract 1 from the first counter, and then returns to S1006, otherwise, goes to S1011 to perform an energy detection in an additional defer duration; determines whether all slot durations within the additional defer duration are idle in S1012, if yes, goes to S1010, otherwise, returns to S1011.

In Embodiment 10, a first given duration includes a positive integer number of subpool(s) among the Q time subpools, and the first given duration is any one duration among all defer durations, all additional slot durations or all additional defer durations included in FIG. 10. A second given duration includes 1 time subpool among the Q1 time subpools, and the second given duration is any one duration among all additional slot durations or all additional defer durations determined to be idle through an energy detection in FIG. 10.

In one embodiment, any slot duration within a given duration includes 1 of the Q time subpools; the given duration is any one duration among all defer durations, all additional slot durations or all additional defer durations included in FIG. 10.

In one embodiment, the phrase that performs an energy detection in a given duration refers to: performing an energy detection in all slot durations within the given duration, wherein the given duration is any one duration among all defer durations, all additional slot durations or all additional defer durations} included in FIG. 10.

In one embodiment, the phrase that a given duration determined to be idle through an energy detection refers that: all slot durations included in the given duration are determined to be idle through an energy detection, wherein the given duration is any one duration among all defer durations, all additional slot durations or all additional defer duration included in FIG. 10.

In one embodiment, the phrase that a given slot duration determined to be idle through an energy detection refers that: the UE senses powers of all radio signals on the first frequency subband in a given time unit and averages the powers over time, and the obtained reception power is lower than a first threshold, wherein the given time unit is a continuous period of time in the given slot duration.

In one subembodiment, a duration of the given time unit is not less than 4 microseconds.

In one embodiment, the phrase that a given slot duration determined to be idle through an energy detection refers that: the UE senses energies of all radio signals on the first frequency subband in a given time unit and averages the energies over time, and the obtained reception energy is lower than a first threshold, wherein the given time unit is a continuous period of time in the given slot duration.

In one subembodiment, a duration of the given time unit is not less than 4 microseconds.

In one embodiment, the phrase that a given slot duration determined to be idle through an energy detection refers that: the first node performs an energy detection in the time subpool included in the given slot duration, and the obtained detection value is less than a first threshold, wherein the time subpool belongs to the Q time subpools, and the detection value belongs to the Q detection values.

In one embodiment, the phrase that performs an energy detection in a given duration refers to: performing an energy detection in all time subpools within the given duration, wherein the given duration is any one duration among all defer durations, all additional slot durations or all additional defer durations included in FIG. 10, and the all time subpools belong to the Q time subpools.

In one embodiment, the phrase that a given duration determined to be idle through an energy detection refers that:

an energy detection are performed in all time subpools included in the given duration and all obtained detection values are less than a first threshold, wherein the given duration is any one duration among all defer durations, all additional slot durations or all additional defer durations included in FIG. 10, the all time subpools belong to the Q time subpools, and the detection values belong to the Q detection values.

In one embodiment, one defer duration is 16 microseconds plus M1*9 microseconds, wherein the M1 is a positive integer.

In one subembodiment, one defer duration includes M1+1 time subpools among the Q time subpools.

In one reference embodiment of the above subembodiment, a first time subpool among the M1+1 time subpools has a duration not greater than 16 microseconds, and the other M1 time subpools each have durations not greater than 9 microseconds.

In one subembodiment, a priority level corresponding to the third radio signal in the disclosure is used for determining the M1.

In one reference embodiment of the above subembodiment, the priority level is a Channel Access Priority Class, and the definition of the Channel Access Priority Class can refer to Chapter 15 in 3GPP TS36.213.

In one subembodiment, the M1 belongs to {1, 2, 3, 7}.

In one embodiment, one defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 ms.

In one embodiment, one additional defer duration is 16 microseconds plus M2*9 microseconds, wherein the M2 is a positive integer.

In one subembodiment, one additional defer duration includes M2+1 time subpools among the Q time subpools.

In one reference embodiment of the above subembodiment, a first time subpool among the M2+1 time subpools has a duration not greater than 16 microseconds, and the other M2 time subpools each have durations not greater than 9 microseconds.

In one subembodiment, a priority level corresponding to the third radio signal in the disclosure is used for determining the M2.

In one subembodiment, the M2 belongs to {1, 2, 3, 7}.

In one embodiment, one defer duration is equal to one additional defer duration.

In one embodiment, the M1 is equal to the M2.

In one embodiment, one additional defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 ms.

In one embodiment, one slot duration is 9 microseconds.

In one embodiment, one slot duration includes 1 time subpool among the Q time subpools.

In one subembodiment, the 1 time subpool has a duration not greater than 9 microseconds.

In one embodiment, one additional slot duration is 9 microseconds.

In one embodiment, one additional slot duration includes 1 time subpool among the Q time subpools.

In one subembodiment, the 1 time subpool has a duration not greater than 9 microseconds.

In one subembodiment, the Q times of energy detections are used for determining whether the first frequency subband is idle.

In one subembodiment, the Q times of energy detections are used for determining whether the first frequency subband can be used by the first node to transmit a radio signal.

In one embodiment, the Q detection values are in units of dBm.

In one embodiment, the Q detection values are in units of mW.

In one embodiment, the Q detection values are in units of J (Joule).

In one embodiment, the Q1 is less than the Q.

In one embodiment, the Q is greater than 1.

In one embodiment, the first threshold is in units of dBm.

In one embodiment, the first threshold is in units of mW.

In one embodiment, the first threshold is in units of Joule.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a high-layer signaling, and the first node is a UE.

In one embodiment, the first threshold is selected by the first node freely that is equal to or less than a first given value.

In one subembodiment, the first given value is predefined.

In one subembodiment, the first given value is configured by a high-layer signaling, and the first node is a UE.

In one embodiment, the Q1 is one of the K candidate integer(s); the T1 first-type radio signal(s) is(are) used for determining K candidate integer(s), and the K is a positive integer.

In one embodiment, the K belongs to {3,7,15,31,63,127, 255,511,1023}.

In one embodiment, the Q times of energy detections are energy detections during Cat 4 LBT process, and the Q1 is a $CW_p$ during Cat 4 LBT, the $CW_p$ represents Contention Window, and the specific definition of the $CW_p$ can refer to Chapter 15 in 3GPP TS36.213.

In one embodiment, detection values among the Q detections values that do not belong to the Q1 detection values include at least one detection value that is less than the first threshold value.

In one embodiment, detection values among the Q detections values that do not belong to the Q1 detection values include at least one detection value that is not less than the first threshold value.

In one embodiment, any two of the Q1 time subpools have equal durations.

In one embodiment, at least two of the Q1 time subpools have unequal durations.

In one embodiment, the Q1 time subpools includes a last one of the Q time subpools.

In one embodiment, the Q1 time subpools include slot durations in an eCCA only.

In one embodiment, the Q time subpools include the Q1 time subpools and G2 time subpools; any one of the Q2 time subpools does not belong to the Q1 time subpools; and the Q2 is a positive integer not greater than the Q minus the Q1.

In one subembodiment, the G2 time subpools include slot durations in an initial CCA.

In one subembodiment, the G2 time subpools have consecutive positions in the Q time subpools.

In one subembodiment, at least one of the G2 time subpools has a corresponding detection value less than the first threshold.

In one subembodiment, at least one of the G2 time subpools has a corresponding detection value not less than the first threshold.

In one subembodiment, the G2 time subpools include all slot durations within all defer slot durations.

In one subembodiment, the G2 time subpools include all slot durations within at least one additional slot duration.

In one subembodiment, the G2 time subpools include at least one additional slot duration.

In one subembodiment, the G2 time subpools include all slot durations within all additional slot durations and all additional defer durations that are determined to be non-idle through an energy detection in FIG. 10.

In one embodiment, the Q1 time subpools belong to Q1 subpool sets respectively, and any one of the Q1 subpool sets includes a positive integer number of time subpool(s) among the Q time subpools; any one of the Q1 subpool sets has a corresponding detection value less than the first threshold value.

In one subembodiment, at least one of the Q1 subpool sets includes 1 time subpool.

In one subembodiment, at least one of the Q1 subpool sets includes more than 1 time subpool.

In one subembodiment, at least two of the Q1 subpool sets include different numbers of time subpools.

In one subembodiment, none of the Q time subpools belongs to two of the Q1 subpool sets simultaneously.

In one subembodiment, all time subpools in any one of the Q1 subpool sets belong to one same additional defer duration or additional slot duration determined to be idle through an energy detection.

In one subembodiment, time subpools among the Q time subpools that do not belong to the Q1 subpool sets include at least one time subpool which has a corresponding detection value less than the first threshold.

In one subembodiment, time subpools among the Q time subpools that do not belong to the Q1 subpool sets include at least one time subpool which has a corresponding detection value not less than the first threshold.

Embodiment 11

Figure 11:
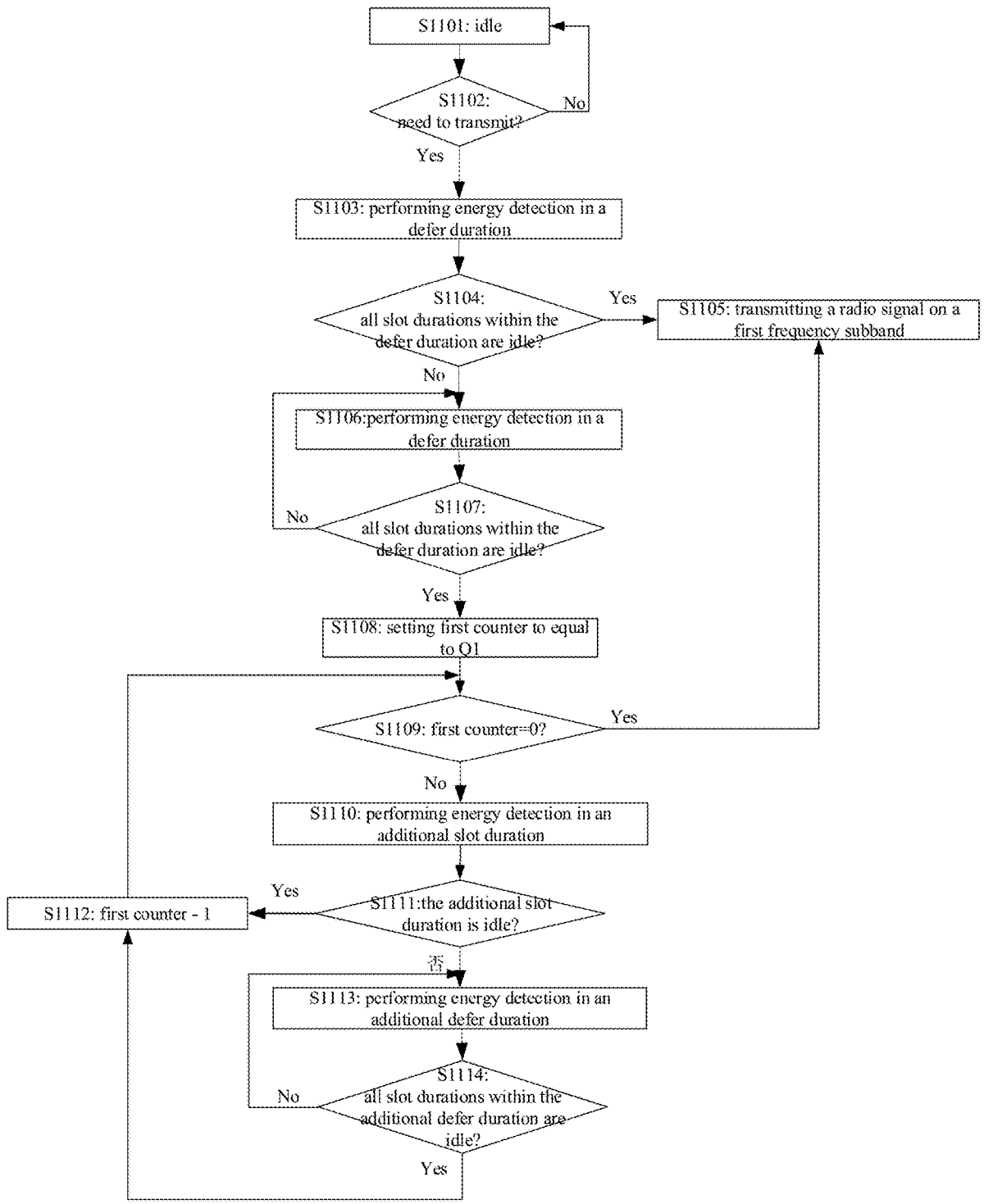
FIG. 11 is a diagram illustrating a process of performing Q times of energy detections in Q time subpools respectively according to one embodiment of the disclosure.

Embodiment 11 illustrates a diagram of a process of performing Q times of energy detections in Q time subpools respectively, as shown in FIG. 11.

In Embodiment 11, the first node in the disclosure performs the Q times of energy detections in the Q time subpools on the first frequency subband in the disclosure respectively to obtain Q detection values. Q1 detection values among the Q detection values are each less than the first threshold in the disclosure. Q1 time subpools are time subpools among the Q time subpools which are corresponding to the Q1 detection values respectively. The process of the Q times of energy detections can be described through the flowchart shown in FIG. 11.

In Embodiment 11, the first node is in an idle state in S1101; determines whether it is needed to transmit signals in S1102; performs an energy detection in a defer duration in S1103; determines whether all slot durations within the defer duration are idle in S1104, if yes, goes to S1105 to transmit a radio signal on the first frequency subband, otherwise, goes to S1106 to perform an energy detection in a defer duration; determines whether all slot durations within the defer duration are idle in S1107, if yes, goes to S1108 to set a first counter to a second threshold, otherwise, returns to S1106; determines whether the first counter is 0 in S1109, if yes, goes to S1105 to transmit a radio signal on the first frequency subband, otherwise, goes to S1110 to perform an energy detection in an additional slot duration; determines whether the additional slot duration is idle in S1111, if yes, goes to step S1112 to subtract 1 from the first counter, and then returns to S1109, otherwise, goes to S1113 to perform an energy detection in an additional defer duration; determines whether all slot durations within the additional defer duration are idle in S1114, if yes, goes to S1112, otherwise, returns to S1113.

In Embodiment 11, a first given duration includes a positive integer number of subpool(s) among the Q time subpools, and the first given duration is any one duration among all defer durations, all additional slot durations or all additional defer durations included in FIG. 11. A second given duration includes 1 time subpool among the Q1 time subpools, and the second given duration is any one duration among all additional slot durations or all additional defer durations determined to be idle through an energy detection in FIG. 11.

In one embodiment, the Q1 is equal to 0, and the first node judges that all slot durations within the defer duration are idle in S1104.

In one embodiment, the Q1 is one of the K candidate integers in the disclosure, the K is a positive integer, and the first node judges that not all slot durations within the defer duration are idle in S1104.

Embodiment 12

Figure 12:
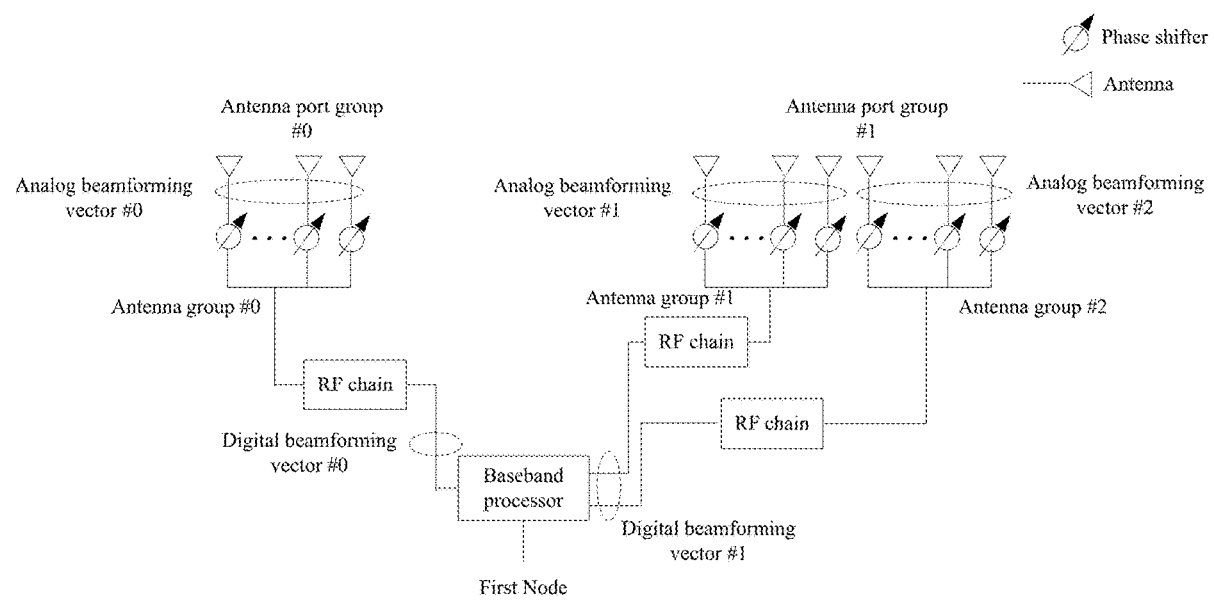
FIG. 12 is a diagram illustrating an antenna port and an antenna port group according to one embodiment of the disclosure.

Embodiment 12 illustrates a diagram of an antenna port and an antenna port group, as shown in FIG. 12.

In Embodiment 12, one antenna port group includes a positive integer number of antenna port(s); one antenna port is formed by antennas in a positive integer number of antenna group(s) through antenna virtualization superposition; one antenna group includes a positive integer number of antenna(s). One antenna group is connected to a baseband processor through one Radio Frequency (RF) chain, and different antenna groups correspond to different RF chains. Mapping coefficients from all antennas in a positive integer number of antenna group(s) included in a given antenna port to the given antenna port constitute a beamforming vector corresponding to the given antenna port. Mapping coefficients from multiple antennas included in any one given antenna group among a positive integer number of antenna group(s) included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 12 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna group, that is, one RF chain, for example, the antenna port group #0 in FIG. 12.

In one subembodiment, an analog beamforming matrix corresponding to the antenna port in the one antenna port group is dimensionally reduced to an analog beamforming vector, a digital beamforming vector corresponding to the antenna port in the one antenna port group is dimensionally reduced to one scalar, and a beamforming vector corresponding to the antenna port in the one antenna port group is equal to its corresponding analog beamforming vector. For example, the antenna port group #0 in FIG. 12 includes one antenna group, the digital beamforming vector #0 in FIG. 12 is dimensionally reduced to one scalar, and the beamforming vector corresponding to the antenna port in the antenna port group #0 is the analog beamforming vector #0.

In one subembodiment, the one antenna port group includes one antenna port.

In one embodiment, one antenna port group includes multiple antenna groups, that is, multiple RF chains, for example, the antenna port group #1 in FIG. 12.

In one subembodiment, the one antenna port group includes multiple antenna ports.

In one subembodiment, different antenna ports in the one antenna port group correspond to a same analog beamforming matrix.

In one subembodiment, different antenna ports in the one antenna port group correspond to different digital beamforming vectors.

In one embodiment, antenna ports in different antenna port groups correspond to different analog beamforming matrixes.

In one embodiment, any two antenna ports in one antenna port group are QCLed.

In one embodiment, any two antenna ports in one antenna port group are spatially QCLed.

Embodiment 13

Figure 13:
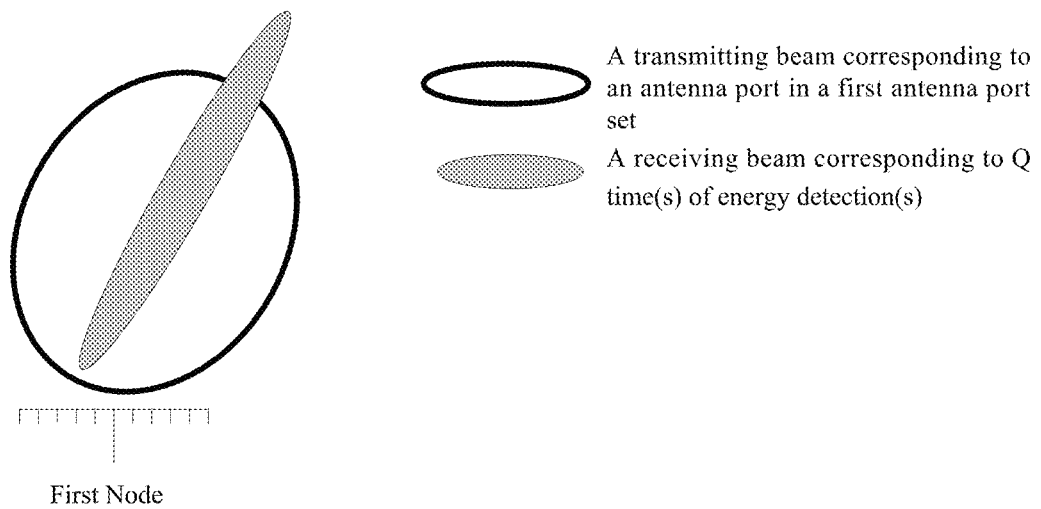
FIG. 13 is a diagram illustrating a relationship between a first antenna port set and a spatial Rx parameter corresponding to Q time(s) of energy detection(s) according to one embodiment of the disclosure.

Embodiment 13 illustrates a diagram of a relationship between a first antenna port set and a spatial Rx parameter corresponding to Q time(s) of energy detection(s), as shown in FIG. 13.

In Embodiment 13, the first antenna port set includes a positive integer number of antenna port(s). A spatial coverage of a receiving beam corresponding to the Q time(s) of energy detection(s) is within a set of spatial coverages of transmitting beams corresponding to all antenna ports in the first antenna port set. In FIG. 13, a bold-line ellipse represents a set of spatial coverages of transmitting beams corresponding to all antenna ports in the first antenna port set, and an ellipse filled with dots represents a spatial coverage of a receiving beam corresponding to the Q time(s) of energy detection(s).

In one embodiment, transmitting beams corresponding to all antenna ports in the first antenna port set are analog transmitting beams.

In one embodiment, transmitting beams corresponding to all antenna ports in the first antenna port set are digital transmitting beams.

In one embodiment, transmitting beams corresponding to all antenna ports in the first antenna port set are analog-digital hybrid transmitting beams.

In one embodiment, the Q time(s) of energy detection(s) all correspond(s) to one same receiving beam.

In one embodiment, a receiving beam corresponding to the Q time(s) of energy detection(s) is analog receiving beam.

In one embodiment, a receiving beam corresponding to the Q time(s) of energy detection(s) is digital receiving beam.

In one embodiment, a receiving beam corresponding to the Q time(s) of energy detection(s) is analog-digital hybrid receiving beam.

In one embodiment, the first antenna port set includes one antenna port.

In one subembodiment, a transmitting beam corresponding to the one antenna port is a wide beam.

In one subembodiment, a spatial coverage of a transmitting beam corresponding to the one antenna port is greater than a spatial coverage of a receiving beam corresponding to the Q time(s) of energy detection(s).

In one subembodiment, a beam gain of a transmitting beam corresponding to the one antenna port is less than a beam gain of a receiving beam corresponding to the Q time(s) of energy detection(s).

In one embodiment, the first antenna port set includes multiple antenna ports, and the multiple antenna ports all correspond to a same transmitting beam.

In one subembodiment, the same transmitting beam corresponding to the multiple antenna ports is a wide beam.

In one subembodiment, the same transmitting beam corresponding to the multiple antenna ports is an analog transmitting beam.

In one subembodiment, a spatial coverage of the same transmitting beam corresponding to the multiple antenna ports is greater than a spatial coverage of a receiving beam corresponding to the Q time(s) of energy detection(s).

In one subembodiment, a beam gain of the same transmitting beam corresponding to the multiple antenna ports is less than a beam gain of a receiving beam corresponding to the Q time(s) of energy detection(s).

In one subembodiment, the multiple antenna ports are QCLed.

In one subembodiment, the multiple antenna ports are spatially QCLed.

In one subembodiment, any one of the Q time(s) of energy detection(s) refers that: the first node in the disclosure receives all radio signals employing one of the spatial receiving parameters (a receiving analog beamforming matrix, a receiving analog beamforming vector, a receiving beamforming vector, a receiving beam and receiving spatial filtering) corresponding to the Q time(s) of energy detection(s) on the first frequency subband in a given time unit, and averages powers or energies of the radio signals over time to obtain a detection value corresponding to the given energy detection; the given time unit is a continuous duration in a time subpool among the Q time subpool(s) that is corresponding to the given energy detection.

In one embodiment, a spatial Tx parameter corresponding to at least one antenna port in the first antenna port set is associated with a spatial Rx parameter corresponding to the Q time(s) of energy detection(s).

In one embodiment, a spatial Tx parameter corresponding to any one antenna port in the first antenna port set is associated with a spatial Rx parameter corresponding to the Q time(s) of energy detection(s).

In one embodiment, the first antenna port set is unrelated to a spatial Rx parameter corresponding to the Q time(s) of energy detection(s) or (a) position(s) of the Q time subpool(s) in time domain.

In one embodiment, a spatial Tx parameter corresponding to any one antenna port in the first antenna port set is unrelated to both a spatial Rx parameter corresponding to the Q time(s) of energy detection(s) and (a) position(s) of the Q time subpool(s) in time domain.

In one subembodiment, the first antenna port set is predefined.

In one subembodiment, the first antenna port set is default.

In one subembodiment, the first antenna port set is semi-static.

Embodiment 14

Figure 14:
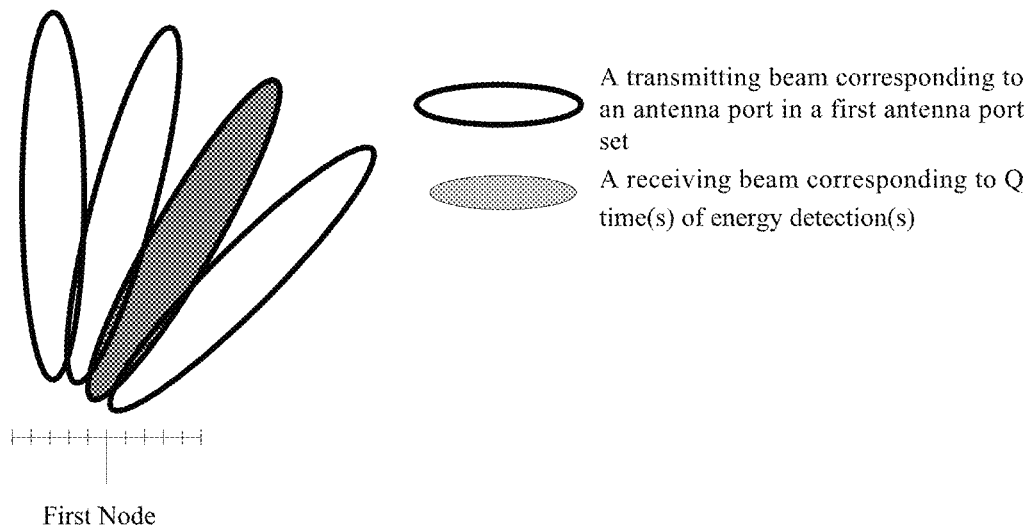
FIG. 14 is a diagram illustrating a relationship between a first antenna port set and a spatial Rx parameter corresponding to Q time(s) of energy detection(s) according to one embodiment of the disclosure.

Embodiment 14 illustrates a diagram of a relationship between a first antenna port set and a spatial Rx parameter corresponding to Q time(s) of energy detection(s), as shown in FIG. 14.

In Embodiment 14, the first antenna port set includes a positive integer number of antenna port(s). A spatial coverage of a receiving beam corresponding to the Q time(s) of energy detection(s) is within a set of spatial coverages of transmitting beams corresponding to all antenna ports in the first antenna port set. In FIG. 14, a bold-line ellipse represents a spatial coverage of a transmitting beam corresponding to an antenna port in the first antenna port set, an ellipse filled with dots represents a spatial coverage of a receiving beam corresponding to the Q time(s) of energy detection(s), and a bold-line ellipse filled with dots represents an intersection of a spatial coverage of a transmitting beam corresponding to an antenna port in the first antenna port set and a spatial coverage of a receiving beam corresponding to the Q time(s) of energy detection(s).

In one embodiment, the first antenna port set includes multiple antenna ports, and at least two of the multiple antenna ports correspond to different transmitting beams.

In one subembodiment, the transmitting beams corresponding to the at least two antenna ports have different center directions.

In one subembodiment, spatial coverages of the transmitting beams corresponding to the at least two antenna ports are pairwise orthogonal (non-overlapping).

In one subembodiment, a set of spatial coverages of beams corresponding to the at least two antenna ports is greater than a spatial coverage of a receiving beam corresponding to the Q time(s) of energy detection(s).

In one subembodiment, any two of the at least two antenna ports are not QCLed.

In one subembodiment, any two of the at least two antenna ports are not spatially QCLed.

In one embodiment, the first antenna port set is unrelated to a spatial Rx parameter corresponding to the Q time(s) of energy detection(s) or (a) position(s) of the Q time subpool(s) in time domain.

In one embodiment, a spatial Tx parameter corresponding to any one antenna port in the first antenna port set is unrelated to a spatial Rx parameter corresponding to the Q time(s) of energy detection(s) or (a) position(s) of the Q time subpool(s) in time domain.

Embodiment 15

Figure 15:
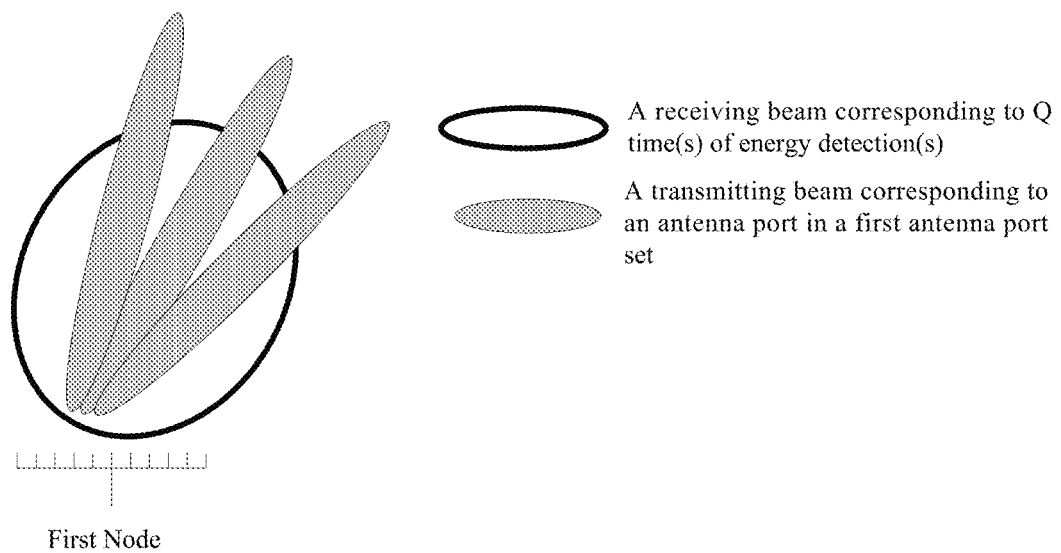
FIG. 15 is a diagram illustrating a relationship between a first antenna port set and a spatial Rx parameter corresponding to Q time(s) of energy detection(s) according to one embodiment of the disclosure.

Embodiment 15 illustrates a diagram of a relationship between a first antenna port set and a spatial Rx parameter corresponding to Q time(s) of energy detection(s), as shown in FIG. 15.

In Embodiment 15, the first antenna port set includes a positive integer number of antenna port(s). A spatial coverage of a transmitting beam corresponding to any one antenna port in the first antenna port set is within a spatial coverage of a receiving beam corresponding to the Q time(s) of energy detection(s). In FIG. 15, a bold-line ellipse represents a spatial coverage of a receiving beam corresponding to the Q time(s) of energy detection(s), and an ellipse filled with dots represents a spatial coverage of a transmitting beam corresponding to an antenna port in the first antenna port set.

In one embodiment, a spatial coverage of a receiving beam corresponding to the Q time(s) of energy detection(s) is greater than a spatial coverage of a transmitting beam corresponding to any one antenna port in the first antenna port set In one embodiment, a beam gain of a receiving beam corresponding to the Q time(s) of energy detection(s) is less than a beam gain of a transmitting beam corresponding to any one antenna port in the first antenna port set In one embodiment, a spatial Tx parameter corresponding to any one antenna port in the first antenna port set is associated with a spatial Rx parameter corresponding to the Q time(s) of energy detection(s).

In one embodiment, the T1 in the disclosure is greater than 1.

In one embodiment, the T1 second-type radio signals in the disclosure include at least two second-type radio signals, and any one transmitting antenna port of one of the two second-type radio signals is not QCLed with any one transmitting antenna port of the other one of the two second-type radio signals.

In one embodiment, the T1 second-type radio signals in the disclosure include at least two second-type radio signals, and any one transmitting antenna port of one of the two second-type radio signals is not spatially QCLed with any one transmitting antenna port of the other one of the two second-type radio signals.

Embodiment 16

Figure 16:
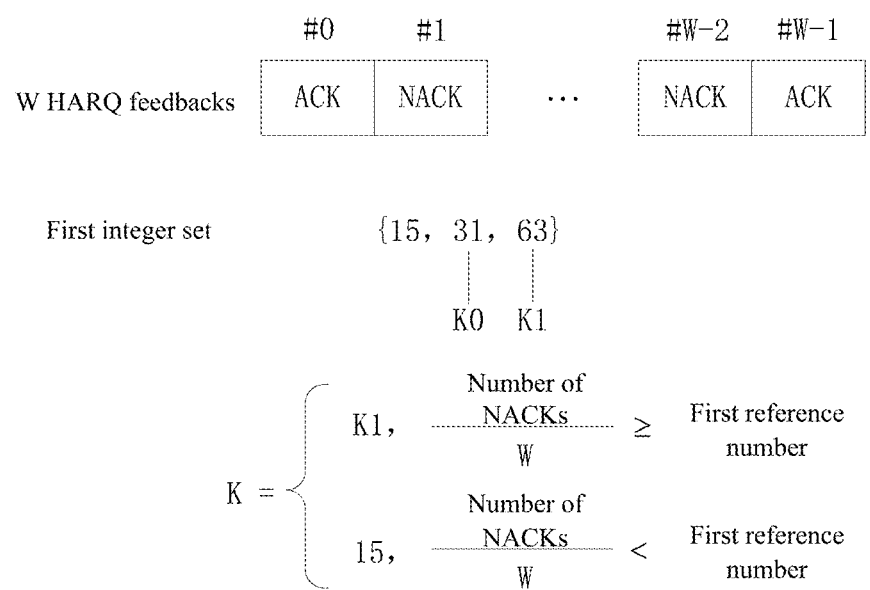
FIG. 16 is a diagram of determining K candidate integer(s) according to one embodiment of the disclosure.

Embodiment 16 illustrates a diagram of determining K candidate integers, as shown in FIG. 16.

In Embodiment 16, the K is a positive integer in a first integer set, and the first integer set includes a positive integer number of positive integer(s); if a first condition is met, the K is equal to K1, otherwise, the K is equal to a minimum positive integer in the first integer set; if K0 is not a maximum positive integer in the first integer set, the K1 is equal to a minimum positive integer in the first integer set that is greater than the K0, otherwise, the K1 is equal to the K0; and the K0 is a positive integer in the first integer set. Q1 is one of the K candidate integers; and Q1 detection value(s) among the Q detection value(s) in the disclosure is(are) all less than a first threshold.

In Embodiment 16, the first node in the disclosure is a base station; the T1 second-type radio signals in the disclosure include W sub-signals, the T1 first-type radio signals are used for determining whether any one of the W sub-signals is correctly received; and the W is a positive integer not less than the T1. The first condition is that: a ratio of a number of sub-signals not correctly received among the W sub-signals to the W is not less than a first reference number.

In FIG. 16, the T1 first-type radio signals totally include W HARQ-ACK feedbacks, any one of the W HARQ-ACK feedbacks has a value belonging to one of ACK (ACKnowledgement) and NACK (Negative ACKnowledgement). The first integer set is {15, 31, 63}, the K0 is equal to 31 and the K1 is equal to 63. If a ratio of a number of NACKs among the W HARQ-ACK feedbacks to the Q is not less than the first reference number, the K is equal to the K1; otherwise, the K is equal to 15. Indexes of the W HARQ-ACK feedbacks are #{0, 1, . . . , W−1} respectively.

In one embodiment, the W is greater than the T1.

In one embodiment, at least one of the T1 second-type radio signals includes multiple sub-signals.

In one embodiment, any one of the T1 second-type radio signals includes multiple sub-signals.

In one embodiment, a given second-type radio signal includes W1 sub-signals, and the given second-type radio belongs to the T1 second-type radio signals, and the W1 is greater than 1.

In one subembodiment, at least two of the W1 sub-signals occupy orthogonal time-frequency resources.

In one subembodiment, at least two of the W1 sub-signals occupy overlapping time-frequency resources.

In one subembodiment, the W1 sub-signals occupy overlapping time-frequency resources.

In one subembodiment, at least two of the W1 sub-signals occupy orthogonal frequency domain resources.

In one subembodiment, a first-type radio signal corresponding to the given second-type radio signal includes W1 sub-signals, and the W1 sub-signals are used for determining whether the W1 sub-signals described above are correctly received.

In one embodiment, the first node selects a value for the Q1 in the K candidate integers randomly.

In one embodiment, it is of the same probability that the first node selects any one of the K candidate integers as the value of the Q1.

In one embodiment, the K candidate integers are 0, 1, 2, . . . , K−1.

In one embodiment, the K is $CW_p$, the $CW_p$ is a size of a content widow, and the specific definition of the CWp can refer to Chapter 15 in 3GPP TS36.213, In one embodiment, any one of the K candidate integers is a non-negative integer.

In one embodiment, the K candidate integers include 0.

In one embodiment, any two of the K candidate integers are unequal.

In one embodiment, the K is a positive integer greater than 1.

In one embodiment, a priority level corresponding to the third radio signal in the disclosure is used for determining the first integer set.

In one subembodiment, a priority level corresponding to the third radio signal is 3.

In one embodiment, the K0 is a $CW_p$ during a last Cat LBT before the Q time subpool(s), the $CW_p$ is a size of a content widow, and the specific definition of the CWp can refer to Chapter 15 in 3GPP TS36.213, In one embodiment, the first reference number is predefined.

In one embodiment, the first reference number is a non-negative real number.

In one embodiment, the first reference number is equal to 80%.

Embodiment 17

Figure 17:
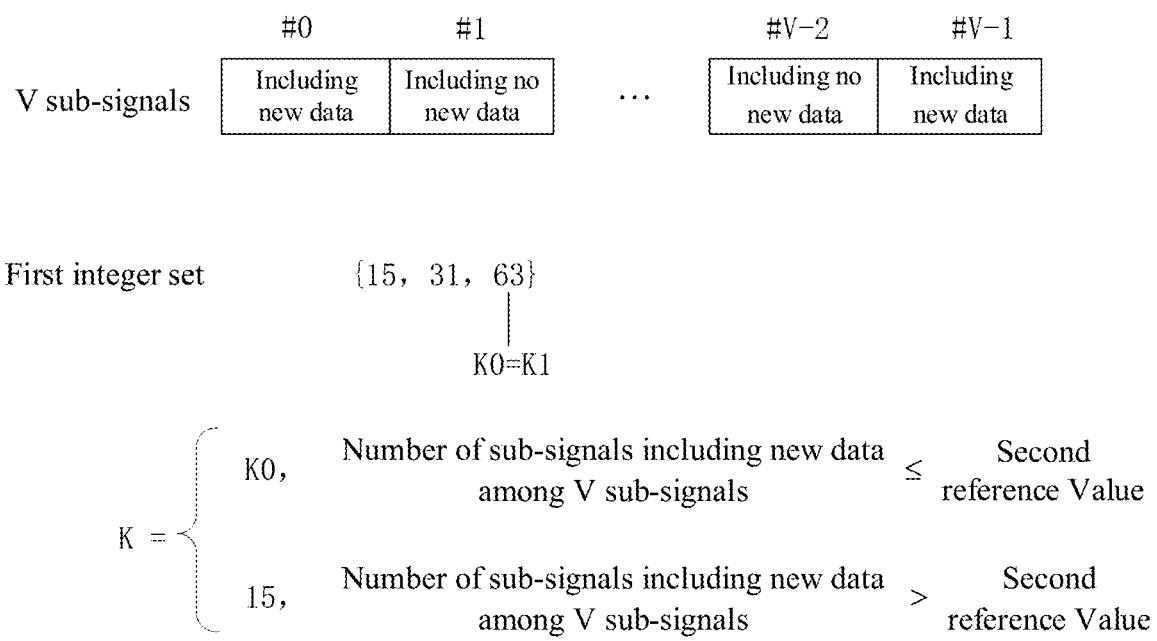
FIG. 17 is a diagram of determining K candidate integer(s) according to one embodiment of the disclosure.

Embodiment 17 illustrates a diagram of determining K candidate integers, as shown in FIG. 17.

In Embodiment 17, the K is a positive integer in a first integer set, and the first integer set includes a positive integer number of positive integer(s); if a first condition is met, the K is equal to K1, otherwise, the K is equal to a minimum positive integer in the first integer set; if K0 is not a maximum positive integer in the first integer set, the K1 is equal to a minimum positive integer in the first integer set that is greater than the K0, otherwise, the K1 is equal to the K0; and the K0 is a positive integer in the first integer set. Q1 is one of the K candidate integers; and Q1 detection value(s) among the Q detection value(s) in the disclosure is(are) all less than a first threshold.

In Embodiment 17, the first node in the disclosure is a UE; the T1 first-type radio signals in the disclosure include T1 second signalings respectively, and the T1 second signalings include scheduling information of the T1 second-type radio signals in the disclosure respectively; the T1 second-type radio signals include V sub-signals, and the T1 second signalings indicate whether any one of the V sub-signals includes new data. The first condition is that: a number of sub-signals including new data among the V sub-signals is not greater than a second reference number.

In FIG. 17, the first integer set is {15, 31, 63}, the K0 is equal to 63, the K0 is a maximum positive integer in the first integer set, and the K1 is equal to the K0. If a number of sub-signals including new data among the V sub-signals is not greater than a second reference number, the K is equal to the K0, otherwise, the K is equal to 15.

In one embodiment, the T1 second signalings are dynamic signalings respectively.

In one embodiment, the T1 second signalings are physical layer signalings respectively.

In one embodiment, the T1 second signalings are dynamic signalings for uplink grant respectively.

In one embodiment, the T1 second signalings include a DCI respectively.

In one embodiment, the T1 second signalings include an uplink grant DCI respectively.

In one embodiment, each of the T1 second signalings includes a first field, and the first field in any one of the T1 second signalings indicates whether each sub-signal in the corresponding second-type radio signal has new data.

In one subembodiment, the first field in any one of the T1 second signalings is an NDI.

In one subembodiment, the first field in any one of the T1 second signalings includes 1 bit.

In one subembodiment, the first field in any one of the T1 second signalings includes 2 bits.

In one embodiment, the V is greater than the T1.

In one embodiment, each of the T1 second-type radio signals includes 1 sub-signal.

In one embodiment, the V is greater than the T1.

In one embodiment, at least one of the T1 second-type radio signals includes multiple sub-signals.

In one embodiment, a given second-type radio signal includes multiple sub-signals, the given second-type radio signal is one of the T1 second-type radio signals, and a second signaling corresponding to the given second-type radio signal indicates whether each of the multiple sub-signals includes new data.

In one subembodiment, the multiple sub-signals include same time-frequency resources.

In one embodiment, the second reference number is predefined.

In one embodiment, the second reference number is a non-negative real number.

In one embodiment, the second reference number is equal to 0.

Embodiment 18

Figure 18:
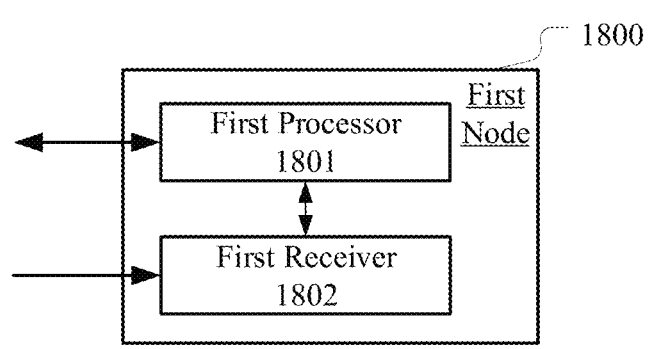
FIG. 18 is a structure block diagram illustrating a processing device in a first node according to one embodiment of the disclosure.

Embodiment 18 illustrates a structure block diagram of a processing device in a first node, as shown in FIG. 18. In FIG. 18, the processing device 1800 in the first node mainly includes a first processor 1801 and a first receiver 1802.

In Embodiment 18, the first processor 1801 receives T first-type radio signals, and transmits T second-type radio signals in T time windows respectively; and the first receiver 1802 performs Q time(s) of energy detection(s) in Q time subpool(s) on a first frequency subband respectively to obtain Q detection value(s).

In Embodiment 18, the T second-type radio signals are one-to-one corresponding to the T first-type radio signals; only T1 first-type radio signal(s) among the T first-type radio signals is(are) used by the first receiver 1802 to determine the Q; the T is a positive integer greater than 1, the Q is a positive integer, and the T1 is a positive integer less than the T; the T1 first-type radio signal(s) consist(s) of all of the first-type radio signals among the T first-type radio signals that are associated to a first antenna port set; the first antenna port set includes a positive integer number of antenna port(s); and the first node is a base station, or the first node is a User Equipment (UE).

In one embodiment, the first node is a base station, the T first-type radio signals are used for determining whether the T second-type radio signals are correctly received respectively.

In one subembodiment, T1 second-type radio signal(s) is(are) (a) second-type radio signal(s) among the T second-type radio signals that is(are) corresponding to the T1 first-type radio signal(s) respectively; the T1 second-type radio signal(s) include(s) W sub-signal(s), the T1 first-type radio signal(s) is(are) used for determining whether any one of the W sub-signal(s) is correctly received; a ratio of a number of sub-signal(s) not correctly received among the W sub-signal(s) to the W is used for determining the Q; and the W is a positive integer not less than the T1.

In one embodiment, the first node is a UE, and the T first-type radio signals include scheduling information of the T second-type radio signals respectively.

In one subembodiment, T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) include(s) new data respectively; and a number of second-type radio signal(s) including new data among the T1 second radio signal(s) is used for determining the Q.

In one embodiment, a spatial Tx parameter corresponding to at least one antenna port in the first antenna port set is associated with a spatial Rx parameter corresponding to the Q time(s) of energy detection(s).

In one embodiment, the first antenna port set is unrelated to both a spatial Rx parameter corresponding to the Q time(s) of energy detection(s) and (a) position(s) of the Q time subpool(s) in time domain.

In one embodiment, the T1 first-type radio signal(s) is(are) used for determining K candidate integer(s), Q1 is one of the K candidate integer(s); Q1 detection value(s) among the Q detection value(s) is(are) all less than a first threshold, the K is a positive integer, and the Q1 is a positive integer not greater than the Q.

In one embodiment, the first processor 1801 further transmits a third radio signal; wherein a start of time domain resources occupied by the third radio signal is not earlier than an end of the Q time subpool(s).

In one embodiment, the first processor 1801 further receives a first signaling; wherein the first signaling includes scheduling information of the third radio signal; and the first node is a UE.

In one embodiment, the first processor 1801 further transmits a first signaling; wherein the first signaling includes scheduling information of the third radio signal; and the first node is a base station.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
   receiving T first-type radio signals, and transmitting T second-type radio signals in T time windows respectively; and performing energy detection(s) in Q time subpool(s) on a first frequency subband to respectively obtain Q detection value(s); wherein:
the energy detection(s) performed in the Q time subpool(s) is(are) used for determining whether the first frequency subband can be used by the first node to transmit a radio signal;
each of the T second-type radio signals is respectively corresponding to each of the T first-type radio signals;
only T1 first-type radio signal(s) among the T first-type radio signals is(are) used for determining the Q;
the T is a positive integer greater than 1, the Q is a positive integer, and the T1 is a positive integer less than the T;
the T1 first-type radio signal(s) consist(s) of all of the first-type radio signals among the T first-type radio signals that are associated to a first antenna port set; the first antenna port set comprises a positive integer number of antenna port(s); and—
the first node is a base station and the T first-type radio signals are respectively used for determining whether the T second-type radio signals are correctly received, or the first node is a User Equipment (UE) and the T first-type radio signals respectively comprise scheduling information of the T second-type radio signals.

2. The method according to claim 1, wherein T1 second-type radio signal(s) is(are) (a) second-type radio signal(s) among the T second-type radio signals that is(are) corresponding to the T1 first-type radio signal(s) respectively; the T1 second-type radio signal(s) comprise(s) W sub-signal(s), the T1 first-type radio signal(s) is(are) used for determining whether any one of the W sub-signal(s) is correctly received; a ratio of a number of sub-signal(s) not correctly received among the W sub-signal(s) to the W is used for determining the Q; and the W is a positive integer not less than the T1.

3. The method according to claim 1, wherein T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) comprise(s) new data respectively; and a number of second-type radio signal(s) including new data among the T1 second radio signal(s) is used for determining the Q.

4. The method according to claim 1, wherein a spatial Tx parameter corresponding to at least one antenna port in the first antenna port set is associated with a spatial Rx parameter corresponding to the energy detection(s) performed in the Q time subpool(s).

5. The method according to claim 1, wherein the first antenna port set is unrelated to both a spatial Rx parameter corresponding to the energy detection(s) performed in the Q time subpool(s) and (a) position(s) of the Q time subpool(s) in time domain.

6. The method according to claim 1, wherein the T1 first-type radio signal(s) is(are) used for determining K candidate integer(s), Q1 is one of the K candidate integer(s); Q1 detection value(s) among the Q detection value(s) is(are) all less than a first threshold, the K is a positive integer, and the Q1 is a positive integer not greater than the Q.

7. The method according to claim 1, further comprising: transmitting a third radio signal;
wherein a start of time domain resources occupied by the third radio signal is not earlier than an end of the Q time subpool(s).

8. The method according to claim 7, further comprising: operating a first signaling;
wherein the first signaling comprises scheduling information of the third radio signal; the operating is receiving, and the first node is a UE; or the operating is transmitting, and the first node is a base station.

9. A device in a first node for wireless communication, comprising:
a first processor, to receive T first-type radio signals, and to transmit T second-type radio signals in T time windows respectively; and
a first receiver, to perform energy detection(s) in Q time subpool(s) on a first frequency subband to respectively obtain Q detection value(s); wherein:
the energy detection(s) performed in the Q time subpool(s) is(are) used for determining whether the first frequency subband can be used by the first node to transmit a radio signal;
each of the T second-type radio signals is respectively corresponding to each of the T first-type radio signals;
only T1 first-type radio signal(s) among the T first-type radio signals is(are) used for determining the Q;
the T is a positive integer greater than 1, the Q is a positive integer, and the T1 is a positive integer less than the T;
the T1 first-type radio signal(s) consist(s) of all of the first-type radio signals among the T first-type radio signals that are associated to a first antenna port set;
the first antenna port set comprises a positive integer number of antenna port(s); and
the first node is a base station and the T first-type radio signals are respectively used for determining whether the T second-type radio signals are correctly received, or the first node is a UE and the T first-type radio signals respectively comprise scheduling information of the T second-type radio signals.

10. The device in the first node according to claim 9, wherein T1 second-type radio signal(s) is(are) (a) second-type radio signal(s) among the T second-type radio signals that is(are) corresponding to the T1 first-type radio signal(s) respectively; the T1 second-type radio signal(s) comprise(s) W sub-signal(s), the T1 first-type radio signal(s) is(are) used for determining whether any one of the W sub-signal(s) is correctly received; a ratio of a number of sub-signal(s) not correctly received among the W sub-signal(s) to the W is used for determining the Q; and the W is a positive integer not less than the T1.

11. The device in the first node according to claim 9, wherein T1 second-type radio signal(s) is(are) (a) second-type radio signal(s) among the T second-type radio signals that is(are) corresponding to the T1 first-type radio signal(s) respectively; the T1 first-type radio signal(s) is(are) used for determining whether the T1 second radio signal(s) comprise(s) new data respectively; and a number of second-type radio signal(s) including new data among the T1 second radio signal(s) is used for determining the Q.

12. The device in the first node according to claim 9, wherein a spatial Tx parameter corresponding to at least one antenna port in the first antenna port set is associated with a spatial Rx parameter corresponding to the energy detection(s) performed in the Q time subpool(s).

13. The device in the first node according to claim 9, wherein the first antenna port set is unrelated to both a spatial Rx parameter corresponding to the energy detection(s) performed in the Q time subpool(s) and (a) position(s) of the Q time subpool(s) in time domain.

14. The device in the first node according to claim 9, wherein the T1 first-type radio signal(s) is(are) used for determining K candidate integer(s), Q1 is one of the K candidate integer(s); Q1 detection value(s) among the Q detection value(s) is(are) all less than a first threshold, the K is a positive integer, and the Q1 is a positive integer not greater than the Q.

15. The device in the first node according to claim 9, wherein the first processor transmits a third radio signal; wherein a start of time domain resources occupied by the third radio signal is not earlier than an end of the Q time subpool(s).

16. The device in the first node according to claim 15, wherein the first processor operates a first signaling; wherein the first signaling comprises scheduling information of the third radio signal; the operating is receiving, and the first node is a UE; or the operating is transmitting, and the first node is a base station.

* * * * *